US010802582B1

(12) United States Patent
Clements

(10) Patent No.: US 10,802,582 B1
(45) Date of Patent: Oct. 13, 2020

(54) EYE TRACKER IN AN AUGMENTED REALITY GLASSES FOR EYE GAZE TO INPUT DISPLAYED INPUT ICONS

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 193 days.

(21) Appl. No.: 15/853,934

(22) Filed: Dec. 25, 2017

Related U.S. Application Data

(63) Continuation-in-part of application No. 14/634,788, filed on Feb. 28, 2015, now abandoned, which is a continuation-in-part of application No. 14/258,013, filed on Apr. 22, 2014, now Pat. No. 9,477,317.

(51) Int. Cl.
| | |
|---|---|
| *G06F 3/01* | (2006.01) |
| *G06F 3/0481* | (2013.01) |
| *G02B 27/01* | (2006.01) |
| *G06F 3/16* | (2006.01) |
| *G06F 3/0488* | (2013.01) |
| *G06T 19/00* | (2011.01) |

(52) U.S. Cl.
CPC ........... *G06F 3/013* (2013.01); *G02B 27/017* (2013.01); *G06F 3/0488* (2013.01); *G06F 3/04817* (2013.01); *G06F 3/167* (2013.01); *G06T 19/006* (2013.01); *G02B 2027/0178* (2013.01)

(58) Field of Classification Search
CPC .... G06F 3/013; G06F 3/0488; G06F 3/04817; G06F 3/167; G02B 27/017; G02B 2027/0178; G06T 19/006
See application file for complete search history.

(56) References Cited

U.S. PATENT DOCUMENTS

| 5,689,619 A * | 11/1997 | Smyth ............... G02B 27/0093 706/45 |
| 6,346,929 B1 * | 2/2002 | Fukushima ............. G06F 3/013 345/156 |
| 7,245,273 B2 * | 7/2007 | Eberl ................... G02B 27/017 345/7 |
| 8,159,458 B2 * | 4/2012 | Quennesson ........... G06F 3/012 345/157 |
| 8,823,740 B1 * | 9/2014 | Amirparviz .............. G02B 5/30 345/633 |

(Continued)

OTHER PUBLICATIONS

Porta & Ravarelli; Eye-Based User Interfaces: Some Recent Projects; May 2010; IEEE; pp. 289-294 (Year: 2010).*

*Primary Examiner* — Michael C Zarroli

(57) ABSTRACT

An eye tracking device, is part of an augmented reality AR headset, and is positioned to view a user's eyes, while wearing the headset. The headset displays input icons in mid-air. The user views the input options. The user's gaze at one the input icons, activates the icon. The input icons can be can be associated to activating functions of the headset, or a device, or an internet web page. The benefits of eye tracking, are interaction with the icons which is natural, intuitive and seamless, and improves user balance. Gaze provides a way to bring the real and the unreal closer together. The eye tracker only needs gaze to activate icons, this frees users from using other input devices, such as, a hand-held hand input device which needs to coordinate gaze and hand movements, or a microphone for voice input, or a camera for hand gesture input.

17 Claims, 12 Drawing Sheets

(56) References Cited

U.S. PATENT DOCUMENTS

| | | | | |
|---|---|---|---|---|
| 9,063,633 B2* | 6/2015 | Rajasingham | | G06F 3/013 |
| 9,229,235 B2* | 1/2016 | Ballard | | H04W 76/10 |
| 9,274,599 B1* | 3/2016 | D'Amico | | G06F 3/013 |
| 9,389,420 B2* | 7/2016 | Maciocci | | G06F 3/011 |
| 9,580,081 B2* | 2/2017 | George-Svahn | | B60W 50/10 |
| 9,773,332 B2* | 9/2017 | Urbach | | G06T 11/60 |
| 9,779,365 B2* | 10/2017 | Smullin | | G06Q 10/02 |
| 9,977,496 B2* | 5/2018 | Maltz | | G06F 3/013 |
| 10,013,141 B2* | 7/2018 | Dayan | | G06F 16/9558 |
| 10,180,572 B2* | 1/2019 | Osterhout | | G02B 27/0093 |
| 10,359,841 B2* | 7/2019 | Liu | | G06T 19/006 |
| 10,365,716 B2* | 7/2019 | Aimone | | A61B 5/04842 |
| 2007/0273557 A1* | 11/2007 | Baillot | | G05D 1/0027 |
| | | | | 340/988 |
| 2008/0218331 A1* | 9/2008 | Baillot | | G08B 21/02 |
| | | | | 340/521 |
| 2012/0194419 A1* | 8/2012 | Osterhout | | G02B 27/0093 |
| | | | | 345/156 |
| 2014/0126782 A1* | 5/2014 | Takai | | G06K 9/0061 |
| | | | | 382/116 |
| 2014/0184550 A1* | 7/2014 | Hennessey | | G06F 3/013 |
| | | | | 345/173 |
| 2014/0267005 A1* | 9/2014 | Urbach | | G06F 3/016 |
| | | | | 345/156 |
| 2015/0049012 A1* | 2/2015 | Liu | | G02B 27/017 |
| | | | | 345/156 |
| 2015/0338917 A1* | 11/2015 | Steiner | | H04M 1/7253 |
| | | | | 345/156 |
| 2016/0116980 A1* | 4/2016 | George-Svahn | | G06F 3/013 |
| | | | | 345/168 |
| 2017/0235360 A1* | 8/2017 | George-Svahn | | G02B 27/01 |
| | | | | 345/173 |
| 2018/0227470 A1* | 8/2018 | Ronngren | | G06F 1/163 |
| 2018/0253145 A1* | 9/2018 | Swaminathan | | G06K 9/00604 |
| 2018/0260024 A1* | 9/2018 | Maltz | | G06F 3/013 |
| 2018/0364810 A1* | 12/2018 | Parshionikar | | G06F 3/017 |
| 2018/0364894 A1* | 12/2018 | Vainio | | G06F 3/0488 |
| 2019/0217196 A1* | 7/2019 | Grant | | A63F 13/10 |

* cited by examiner

```
┌─────────────────────────────────────────────────────────┐
│ INPUT ICONS, AND CURSOR ARE DISPLAYED ON MID-AIR        │
│ DISPLAY BY AUGMENTED REALITY HEADSET 302                │
└─────────────────────────────────────────────────────────┘
                          ↓
┌─────────────────────────────────────────────────────────┐
│ CURSOR'S LOCATION IS ASSOCIATED TO USER'S EYE GAZE      │
│ POINT'S LOCATION, ON THE DISPLAY, CURSOR MOVES          │
│ WITH EYE GAZE POINT 304                                 │
└─────────────────────────────────────────────────────────┘
                          ↓
┌─────────────────────────────────────────────────────────┐
│ EYE TRACKER DETECTS THE USER'S EYE GAZE AT              │
│ INPUT ICONS 306                                         │
└─────────────────────────────────────────────────────────┘
                          ↓
┌─────────────────────────────────────────────────────────┐
│ ACTIVATION OF INPUT ICONS, ARE ASSOCIATED TO            │
│ ACTIVATION OF COMPUTER FUNCTIONS OF THE HEADSET,        │
│ THE INTERNET, OR FUNCTIONS OF A DEVICE CONNECTED        │
│ TO THE HEADSET 308                                      │
└─────────────────────────────────────────────────────────┘
                          ↓
┌─────────────────────────────────────────────────────────┐
│ USER GAZES AT ICON TO ACTIVATE ICON,                    │
│ CURSOR CONTACTS ICON 310                                │
└─────────────────────────────────────────────────────────┘
                          ↓
┌─────────────────────────────────────────────────────────┐
│ ICON IS HIGHLIGHTED 312                                 │
└─────────────────────────────────────────────────────────┘
                          ↓
┌─────────────────────────────────────────────────────────┐
│ AS EYE GAZE CONTINUES AT ICON, A CLOCK IS SHOWN         │
│ NEXT TO CURSOR, COUNTING TO ABOUT 1 SECOND 314          │
└─────────────────────────────────────────────────────────┘
                          ↓
┌─────────────────────────────────────────────────────────┐
│ AT ABOUT 1 SECOND OF EYE GAZE, THE ICON ACTIVATES 316   │
└─────────────────────────────────────────────────────────┘
                          ↓
┌─────────────────────────────────────────────────────────┐
│ THE ACTIVATED ICON, ACTIVATES THE COMPUTER FUNCTION,    │
│ OR DEVICE FUNCTION ASSOCIATED TO THE ICON 318           │
└─────────────────────────────────────────────────────────┘
                          ↓
┌─────────────────────────────────────────────────────────┐
│ THE ACTIVATED COMPUTER FUNCTION, OR                     │
│ DEVICE FUNCTION, INFLUENCES THE OPERATION               │
│ OF THE COMPUTER HEADSET, OR DEVICE 320                  │
└─────────────────────────────────────────────────────────┘
                          ↓
┌─────────────────────────────────────────────────────────┐
│ THE HEADSET RECEIVES, AND DISPLAYS FEEDBACK,            │
│ FROM THE COMPUTER, OR DEVICE, CONCERNING THE            │
│ EFFECT OF THE INFLUENCE ON THEIR OPERATION 322          │
└─────────────────────────────────────────────────────────┘
```

FIG. 12

EYE TRACKER IN AN AUGMENTED REALITY GLASSES FOR EYE GAZE TO INPUT DISPLAYED INPUT ICONS

CROSS REFERENCE TO RELATED APPLICATIONS

This present application is a continuation application of application Ser. No. 14/634,788, filled 2015 Feb. 28, and naming Sigmund Clements as inventor, which is a continuation in part of application Ser. No. 14/258,013 filed 2014 Apr. 22, and naming Sigmund Clements as inventor. All of the foregoing applications are hereby incorporated herein by reference in their entirety.

TECHNICAL FIELD

The present invention relates to augmented reality glasses, and user input devices, used to operate the augmented reality glasses.

BACK GROUND OF THE EMBODIMENTS

Many augmented reality AR glasses, determine where the user is looking, by inferring where the user is looking, by determining the direction that the glasses are pointed. Hand gestures are needed with inference of the user's eye gaze, to allow the user to input into mid-air objects that they are looking at.

The user needs to do two actions, to input an input icon, which include, eye looking, and hand gestures. A drawback of using hand gestures, is other people are aware of the user's hand gestures. Following are some disadvantages, of user input devices for AR glasses.

Smart glasses, use voice recognition, to recognize a user's voice commands, to operate the glasses. The commands operate devices, such as, a video camera in the glasses. The video camera records images of what the glasses are pointed at, and the user is viewing. A drawback of voice commands it other users may hear the voice commands.

Disadvantages (a) Determining where the user is looking doesn't activate displayed input icons.

(b) Voice commands to input into glasses, allow other users, to hear the voice commands.

(c) A user needs to learn voice commands, to operate a voice recognition device in glasses.

(d) A user needs to learn hand gesture commands, to operate a hand gesture recognition device, in glasses.

(e) A user's hands may get tired, when using hand gestures, to input into a hand gesture device, in glasses.

(f) A user's voice may get tired, when using voice commands, to input into a voice recognition device, in glasses.

(g) Hand held controls used to input into the headset need, the user's hands to be occupied by the controller's.

(h) Bacteria on physical touch input buttons, can get on a user's fingers, by touching the touch input buttons.

(i) Static electric sparks can be created by fingers touching physical touch input buttons, this may have a negative impact in flammable enjoinments.

(b) Using hand gestures to input into glasses, allow other people to be are aware, of the user's hand gestures

SUMMARY OF THE EMBODIMENTS

An eye tracking device, is part of an augmented reality glasses. The eye tracking device is positioned to view the user's eyes while the glasses are being worn A menu of commands is displayed in mid-air, by the headset. The menu includes input icons. The eye tracking device detects, the user's eye gaze, at one of the input icons. The input icons, are associated to computer functions, or device functions, or internet web page functions operated by the headset.

Input icons, are inputted by the detection of the user's gaze one of the icons, for a time of about 1 second. The activated icon activates the computer function of the headset, or the device function associated to the input icon. The activated computer function of the headset, or the device influences the operation of the computer, or device.

The headset receives and displays feedback, from the computer, or device, concerning the influence the activated computer function, internet, or device function has had on the computer, internet, or device.

The computer functions of the headset, include, a left click function, a displayed internet browser, and web page. The browser having internet search functions, and inputs, such as, search, and chat.

Device control panels, operate devices, include elevators, and smart toilets, etc. The elevator control panel, shows input icons, such as, elevator up, or down call buttons, floor 1, 2, or 3, etc. The user operates the device, by activating the input icons, with the gaze of their eyes.

The headset connects to the devices, wirelessly, using wireless systems, such as, cell phone networks, WIFI, Bluetooth, an internet, and infrared light.

The headset is portable, and allows the user to interact with various devices, as they travel in a building environment, or in a city environment. The headset allows the user to operate the headset computer, internet, or device, with the gaze of their eyes.

How Eye Tracking Works

The eye tracker sends out near infrared light. The light is reflected in the user's eyes. Those reflections are picked up by the eye tracker's cameras. Through filtering, and algorithms calculations the eye tracker knows where the user is looking.

The algorithms control the sensors, and the illuminators. Based on the sensor images they identify, and calculate the position of the eyes, where the user is looking, and the size of the pupils Augmented Reality, and Mixed Reality Augmented reality, and mixed reality is a live, direct or indirect, view of a physical, real-world environment whose elements are augmented by computer-generated sensory input such as sound, video, graphics or Global Positioning System GPS data. It is related to a more general concept, called mediated reality, in which a view of reality is modified (possibly even diminished rather than augmented) by the computer.

As a result, the technology functions by enhancing one's current perception of reality. Augmentation is conventionally in real-time, and in semantic context with environmental elements, such as sports scores on TV during a match.

With the help of advanced AR technology (e.g. adding computer vision and object recognition) the information about the surrounding real world of the user becomes interactive and digitally. Artificial information about the environment, and its objects can be overlaid on the real world.

Some AR glasses are designed to project light directly into users' eyes to trick their brains into perceiving virtual objects as part of their surrounding environment Advantages Advantages of an eye tracker in an AR headset, for using eye gaze to active input icons, displayed in mid-air are described.

(a) A user's eye gaze operates augmented reality AR glasses, by gaze activating input icons, displayed in mid-air.

(b) Hand gestures aren't needed to input into glasses, which eliminates other people being aware of the user using hand gestures.

(c) A user's hands don't get tired when using eye gaze, to input AR glasses input icons.

(d) A user doesn't need to learn hand gesture commands, to operate a hand gesture recognition device, in AR glasses.

(e) A user doesn't need to learn voice commands, to operate a voice recognition device in AR glasses.

(f) Other people aren't aware of the user using voice commands, or what the voice commands are, since voice commands aren't needed to input into glasses.

(g) The user doesn't need to use hand held controllers, to input into the headset, the user's hands don't need to be occupied by the controller's.

(h) The user doesn't need to use hand held controllers, which may have harmful bacteria on them to input into the headset. The hand-held controllers can be avoided by using eye gaze input to input holographic, mid-air input buttons to operate the headset.

(i) An eye tracker doesn't have moving parts, so there is less wear on them, then hand held controllers, which have parts moved by the user's input.

(j) Concentration is only on gaze input, instead of two things, such as, hand input and gaze input.

(k) This interaction is natural, intuitive and seamless because it closely mimics real-life interaction.

Additional Advantages of Eye Tracking in Augmented Reality

Platform Enhancements for AR Graphics Rendering, Gaze Prioritized Graphics

Eye tracking allows for Gaze Prioritized Graphics also known as Foveated Rendering. It displays the highest resolution graphics specifically in the region the user is currently looking while simultaneously displaying lower resolution graphics to areas on the screen in the user's peripheral vision.

This functionality requires extremely fast, precise and continuously accurate eye tracking to effectively bridge the communication gap between the user's eye movement and the content's current display within the HMD.

With this optimization, screens can use significantly less bandwidth from the CPU and GPU without sacrificing highly-detailed and realistic environments for the user in crisp, brilliant resolution.

AR eye tracking platform provides gaze data that can be used for foveated rendering.

Accurate 3D Stereoscopic Rendering

In order to build an AR headset with accurate 3D rendering for all users, the system needs to know the correct eye position for each user at all times. For example, if the inter-pupillary distance of a particular user is different to what the AR system is set up for the 3D rendering will become incorrect. An AR eye tracking platform provides consistent accurate eye position measurements in all key dimensions.

AR Immersions

This functionality harnesses natural eye movement to make the AR environment and input icons more realistic.

Natural Targeting

To view an input icon, users will now only need to look in a direction or at an icon rather than physically motion their forehead towards the icon. This interaction is natural, intuitive and seamless because it so closely mimics real-life interaction.

Immersive Graphics and Sound

To create emotive reactions from users it is critical to know where their attention is focused, such as, looking at an input icon.

Humanizing Technology

AR and eye tracker can create truly immersive and natural experiences. Entirely unique experiences while using gaze input build in repeat-use value for users.

Heightened Emotions

AR has the unique ability to tap into our basic human emotions in a way that will pull the user deeper into the VR experience AR Head-mounted Display equipped with an eye tracker 'knows' a user's intentions because what you look at is a good approximation of what you think. Users convey many of their complex human emotions using their eyes, eye tracking provides an unprecedented way to bring the real and the unreal closer together.

Still further benefits of eye gaze, used to input AR headset displayed input icons, will become apparent from a study of the following description, accompanying drawings, and claims.

BRIEF DESCRIPTION OF THE DRAWINGS-FIGURES

FIG. 12 depicts a software flowchart, of a user's operation of an eye tracking device in an AR headset's, multiple visual feedback icons, and external devices.

Figure 1:
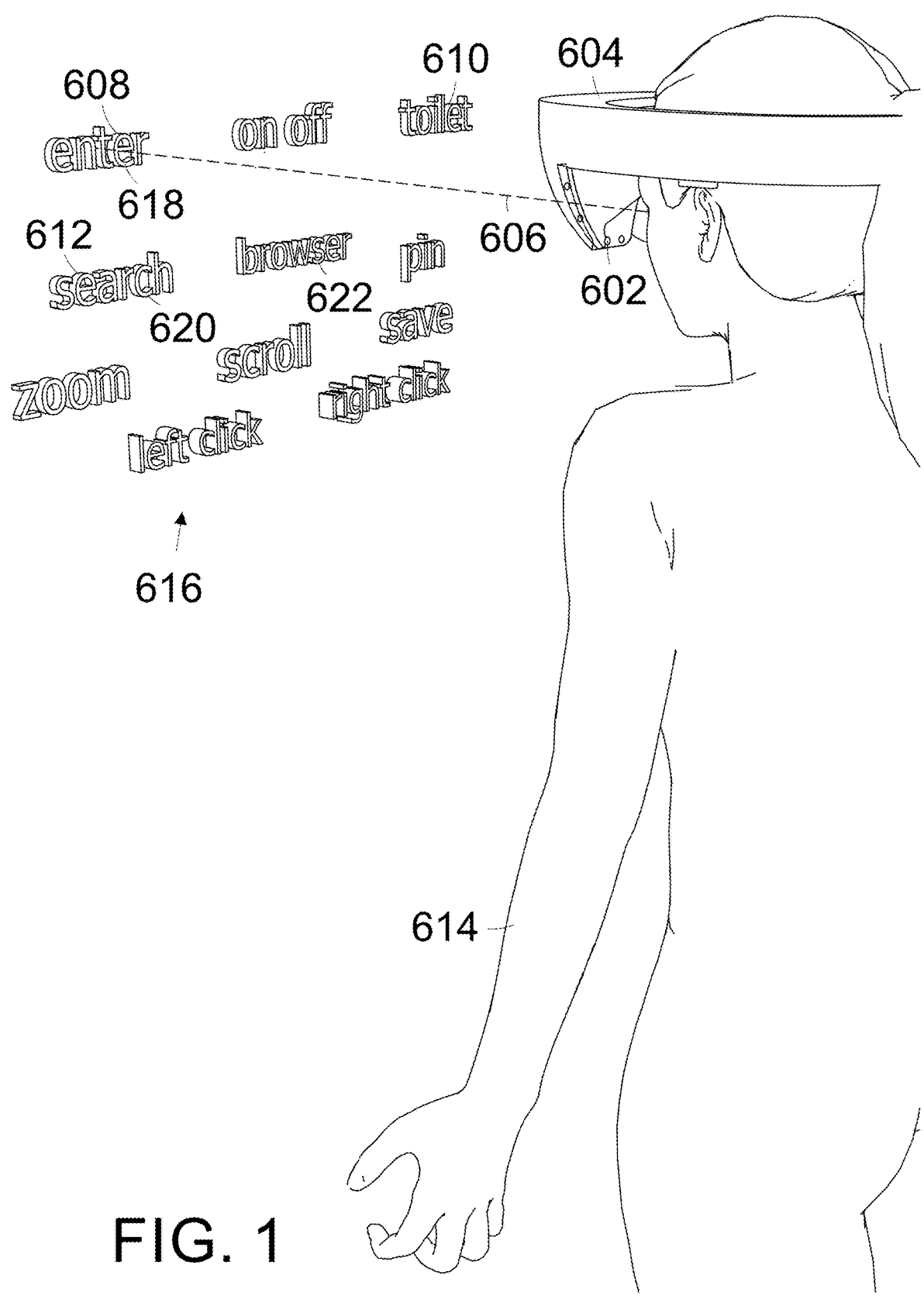
FIG. 1 shows a perspective view, of an augmented reality AR headset having an eye tracking device, and a computer command displayed in mid-air.

DRAWINGS REFERENCE NUMERALS 102 eye tracker
104 augmented reality AR headset
106 gaze
108 input icon computer function
110 input icon device function
112 input icon web page function
114 user
116 input icons display
118 cursor
120 timer
122 highlight
124 on icon
126 cell phone tower
128 cell phone
130 bidet's operating menu
132 water pressure
134 water temperature settings warm
136 increase water pressure.
138 decrease water pressure
140 front wash
142 back wash
144 toilet
148 medical device
150 microwave cellular connection,
154 a WIFI connection
156 local Area Network
158 Bluetooth radio waves
162 elevator
164 internet
168 router
170 web page
172 web page internet search
174 web page
178 enter icon
180 search
202 eye tracker
204 headset
206 gaze
208 toilet back wash icon
210 2D icon
212 3D input icons
214 user
216 input icons display
218 cursor
222 highlight
224 left click command
602 eye tracking sensor
604 AR headset 604
606 eye gaze
608 input icon computer function
610 input icon device function
612 input icon web page function
614 user
616 input icons display
618 enter input
620 internet search operation
622 browser

DETAILED DESCRIPTION OF EMBODIMENTS

First Embodiment

Eye Tracker Input Device in an Augmented Reality Headset Description

An augmented reality AR headset, or a mixed reality MR headset 604, has an eye tracking sensor 602. The headset displays mid-air input icons. The eye tracker in the headset, allows a user's eye gaze, to activate the input icons.

Figure 2:
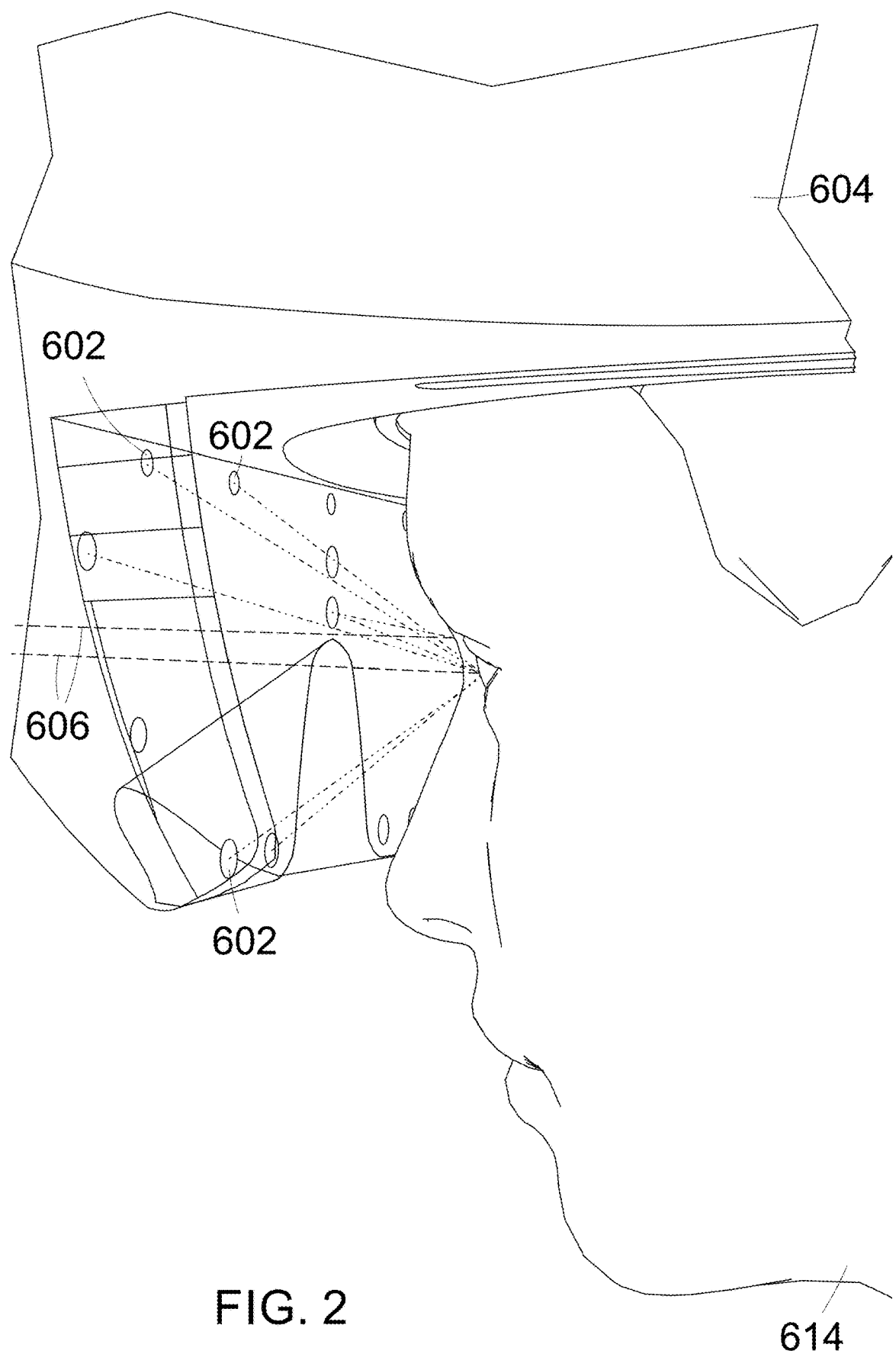
FIG. 2 shows a perspective view, of an eye tracking device in a AR headset.

The eye tracking sensor, eye tracker 602, tracks a user's eye gaze 606, as they view their environment outside to the headset as shown in FIG. 2. The eye tracker is positioned in the headset, to view the user's eyes 614. The user 614 views input icons 616, displayed three dimensionally 3D, in mid-air.

The eye tracker 602 connects to a computer, in the headset 604. The computer is programmed, with an eye tracking software.

The headset uses eye tracking, and eye gesture recognition, to operate the glasses external devices operating panel. The panel is displayed in mid-air. The glasses track the user's eye movements.

A Displayed Gaze Timer

The computer has a timer, that records the time, that the user is detected, looking at one of the icons. The timer is displayed on the display, when gaze is detected for. 4 seconds. The timer shows the counting of the time, until the icon activates. The timer is located next to, the gazed at icon.

The headset 604 displays images, on glass lens that the user views. The images create an optical illusion for the user, that the input icons, menu items 616, are displayed three dimensionally, holographically, and or two dimensionally 2D, in mid-air, as shown in FIG. 1. The input icons are displayed, in the user's surroundings.

The display input icons stay pined, to their location in their environment. When the user moves the headset, the input icons don't move. The input icons can be set to move, with the movement of the headset, is the user desires.

The Icons Can Operate Different Functions,

The icons can operate different functions, such as, an internet operation 612, a device operation 610, or computer operation 608, as shown in FIG. 1. A browser input icon 622 is used in internet operations, to display a search web page.

Input icons are displayed on the displayed web page, such as, an internet search operation icon 620. The search operation, is used to search 620 the internet. The user types into the search operation type box, information requested by the user, and activates the search operation icon. The results of the search, are displayed on the display.

The icons show computer functions 608, such as, an 'enter' input 618, or command. The icons show device functions 610, such as, a toilet' icon, which is used as part of an electronic bidet in a toilet.

Headset Functions

Headset Functions can, include a display a brightness control. The brightness control can be displayed as a line, that the user looks at. Locations on the lie are associated to a percentage of the brightness of the display. The brightness percentage is from 0 to 100 percent. A change in a percentage of brightness increases or decreases the brightness from its present setting. An icon on the line graphically displays the brightness percentage A sliding icon on the line can also be used, to adjust the brightness to the display. The sliding icon shows the brightness percentage. The user gazes at the sliding icon, to activate it. The activated sliding icon, follows the user's gaze location. If the gaze is above the sliding icon the sliding icon moves up, and vice a versa. Move of the sliding icon up this increases a sound of the headset, or below the icon decrease the sound.

The sliding icon can be used for display size, to increase, or decrease its size. The size of the display can be increased or decreased.

The Displayed

A map is part of the headset, with the locations of the headset, and device shown on it. The map is displayed on the headset display, with the locations, of the headset, and device. The map displays the relationship of the location of the headset to the device, and distance.

When the headset, and device are at a distance on the map, the device, and headset connect with each other through the internet. The device sends its virtual control panel to the headset. The control panel is displayed by the headset.

The user operates the device, by inputting into the control panel. The inputs into the control panel, are sent to the device. The device uses the received inputs into its control panel, to effect, influence the operation of the device. The influenced operation of the device is sent to the headset. The headset displays the influenced operation of the device.

For example, the user is close to an automated teller machine ATM. An icon is displayed that the ATM can be operated. The ATM icon is activated. The ATM control panel is displayed on the display. The control panel displays inputs, such as, deposit, withdrawal, a 1-10 number pad, enter, change, and cancel, etc.

The user inputs a deposit input, using eye gaze. The deposit screen is displayed. Eye gaze inputs 11 dollars, by looking, at the numbers 1100 on the number pad consecutively. Eye gaze activates the enter input. The 11 dollars of currency is deposited, and accepted by the ATM, and the acceptance is displayed by the headset. The user ends the session with the ATM, by using eye gaze, to activate a log out input.

Manual Connection to a Device by Headset

The headset connects to the device, thru the device's web page. The device's location is shown on the map, with an icon representing the device. A name, or description, which describes the device's icon, such as, smart toilet, or elevator.

The icon is activated by eye gaze. The activated icon shows an icon window. On the icon window is displayed an internet link to the device's control panel. The window can give more information about the device, such as, how many users are using the device. and user reviews about the device.

The link is described as, the devices control panel. The link is activated, and the control panel for the device is displayed. The control panel show different imputable operations for the device, with input icons. The user operates the device, by activating the input icons, with eye gaze.

The link is connected an internet address for the device. The device's internet address, is managed by the server that the device is connected to. The device connects to a router. The router connects the server that its specific to the device. The devices web page is managed, and or stored on the device's computer, or the device's server. Information from the device is sent to the headset, and information from the headset is sent to the device.

The web page gives visual feedback, on how the activated functions of the device, influences the operation of the device. The headset receives, and displays the feedback, from the device, concerning the influence the activated device operation, has had on the device.

The Device Icons are Short Cuts to the Device Control Panel

The device icons are short cuts to the device control panel. The device short cut is linked to an internet link for the device control panel. The activation of the device icon, opens the control panel for the device, and displays the it, without showing the link of the device in a window.

Down Loading the Devices Control Panel and Operating the Device with Bluetooth Radio Waves The device's web link is activated. The devices control panel is downloaded to the headset. The downloaded control panel is displayed with an input icon short cut to the control panel. The icon visually identifies, that it is an icon for the device. The icon is activated, and the control panel is displayed. The headset connects to the device using Bluetooth radio. The user activates the device's control panel input icons using eye gaze. The activated icon operates the device.

Single Network for The Devices, And Manual Connection

The devices use a single network. The manual connection procedure of the headset, to devices can be used. The devices connect to the headset, on servers of a single network, that can be operated by a company. The devices are connected to the network's servers. The network displays the map web page. The devices web pages, and devices information are stored on the network's servers.

The headset connects to the network map, and devices over the internet. The headset operates the devices by communicating with the devices thru the network's servers.

Map Search for Devices

The user can zoom into and out of the map. The map is a graphic representation of the area, with written descriptions, such as, streets, street names, buildings, names of points of interest, like, parks, stores, restaurants, metro stations. The map can be a picture view, such as, internet street view, that shows 3D picture views of the street, of the user's headset, and devices locations.

Devices Shown on The Map

Device that can be operated by the headset are shows at their locations, on the map, such as, elevators, and store checkout pay machines.

The map can be searched for devices, with a search map engine. The user can search for devices on the map, such as, smart toilets, gas station gas pumps, with the search results shown at their locations on the map.

The server that the headset is connected to, connects to the server that the device is connected to. The device, and headset communicate thru the connected servers.

The device can limit the distance that the device can be operated, such as, 20 meters. If more than one user is using a single user device, for instance, an ATM, the first user uses the device. The users are assigned a number in line, each user shown the number, of their location in the line to use the ATM, such as, number 3.

If the device is a multiuser device, like, an elevator, the first user's input, effects the operation of the elevator. The first user to input a floor number, is inputted, then the next detected user to input floor number, so the detected inputted floor numbers are recorded, and displayed consecutively.

Find the Device by Viewing the Device's Location on the Map

The headset has a global positioning system GPS, and the device has a GPS. The position of the headset, and device plotted on a map on the server, such as, an internet map. The map determines the distance from the headset, to the device.

The user finds the device, by viewing the device's, and headset's location on the map. The map can be an internet map that shows streets, and buildings, and environmental information. The user can move to the device, and view the headset's icon's location moving, in real time on the map. The user can view their progress toward the device, as the map updates the headset's location on the map.

The AR glasses, have a route software, which augments reality, by showing a line, route that is displayed on the environment, and viewable by the user. The line is followed to reach the device. The route is pinned to the environment, as the user walks, drives an automobile, or cycles a bicycle, motorcycle, or self-driving car.

The route in the environment, is the same as the map route, and follows the route, that is displayed on the map. The user can follow the route line to reach the device's destination.

Example of an Augmented Reality Glasses with an Eye Input Device Operating an ATM The user views the ATM with the name of the bank that operates it on the map, us an icon with a graphic symbol. By gaze activating the icon, the name of the ATM, a description, of the service that the ATM provides, such as, deposit or withdrawal, the hours of operation, and its address, is displayed.

Devices can be shown such as, elevators, vending machines, and store checkout payment stations. Each device is connected, to one of many servers. Each server is connected to the internet. Each device has an internet address, that is unique to the device. Each device has a web page that is specific to that device. The web page for one of the device's, displays the devices control panel. The page is interactive with the user. The user can operate the device, by eye gaze, activating commands for functions of the device on the web page.

Headset Connecting to the Devices Through the Internet

The headset uses radio waves, to communicate wirelessly, with the devices.

The headset can communicate with the device through the internet. The headset has a cell phone transmitter and receiver, for connecting to a cell phone tower.

The device connects to an internet router, either wirelessly, or wired. The device internet router, connects to a server for the device. The device server connects to the internet.

The headset connects to a cell phone tower. The tower connects to an internet router for the tower. The tower router connects to a web server for the tower. The tower web server connects to the internet. The device server connects to the tower web server, over the internet. The headset connects to the device through the internet.

The device's server hosts the devices web page. The device, and headset each, have a unique IP address (Internet Protocol address) to identify each other, over the internet. The addresses can be an IP address using IPv4 or IPv6. The Internet Protocol (IP) is the principal communications protocol in the Internet. A security software in each the headset, and device. can secure the connection between the headset, and device.

The device, and headset may both use their own internet service provider ISP, to access the internet. The ISPs may be part of an internet exchange.

The headset, and device communicate with each other over the internet, using internet protocol language. The communication between client, and server takes place using the Hypertext Transfer Protocol (XHTTP), The communication can use MQTT which is a protocol for machine-to-machine and Internet of Things deployments. The communication can use CoAP which is aimed at one-to-one connections.

The IP address identifies the host, or its network interface, and it provides the location of the host in the network, and the capability of addressing that host.

The headset, and device each have a unique DNS (Domain Name System). The DNS turns the headset, and device domain names into unique Internet Protocol (IP) address. The headset, and device each have a communication software. The headset, and device use their respective internet addresses, to find each other, and connect to each other over the internet.

Headset Connected to the Internet, by Connecting to a Phone Connected to the Internet The headset can connect to the internet, by connecting to a phone. The headset connects to the phone using Bluetooth radio waves. The phone connects to a cell phone tower. The cell phone tower network connects to the internet. This allows for the headset to use lower energy Bluetooth radio waves, to connect to the internet.

The headset connects to the internet, by connecting to a cell phone tower, which is connected to a phone internet server, with the cell phone tower network connected to the internet.

The headset, and or device, or both broadcast, on their respective servers, over the internet, their availability to connect with each other. The headset broadcasts, it's availability to connect to the device, and the device it's availability to connect to the headset.

Eye Tracker Input Device in an Augmented Reality Headset Operation

The eye tracker 602 detects where the user's 614 gaze 606 is directed, looking. The eye tracker detects, when the user gazes at one of the icons 616, as shown in FIG. 2.

For example, the user gazes, at the enter input 618, as shown in FIG. 1. After 1 second of gaze, the enter input is activated. The activated enter input is used, to enter an input, for the headset, or web page, or device.

Gaze at the icon, activates the timer. After a time of about 1 second, of continued gaze 106, the icon activates.

A signal that the icon has activated, is sent to the device, to operate a function of the device. The device receives the signal to operate the function of the device. The device uses the received function signal to operate the device.

The headset 604 receives, and displays feedback, from the computer 604 in the headset, concerning the influence the activated computer function, has had on the headset computer.

The headset receives, and displays feedback, from a computer in the device, concerning the influence the activated device function, has had on the device.

Headset Operation of a Smart Toilet

The user can use the headset, to control a smart toilet's bidet. The user's looks at the bidet icon they want to activate. After a time of 1 second, the icon activates. The activated bidet icon signal, is sent to the bidet device, to operate the bidet. The icons include either water temperature increase, or decrease icons.

The eye tracker 602 detects the user's gaze, at the bidet's increase water temperature icon. The timer starts in the headset, at the detection of the gaze, at the temperature icon. At about 1 second, of the detection of continued gaze, at the temperature icon, the icon is activated.

The headset sends, the bidet the activated increase water temperature icon function. The bidet receives, the increase water temperature icon function. The increase water temperature function, influences the operation of the bidet. The water temperature of a water stream from the bidet, is increased.

The headset receives information from the bidet, that the water temperature has increased. The received water temperature increase, is displayed in mid-air, and viewable by the user.

Operation Flowchart

Figure 10:
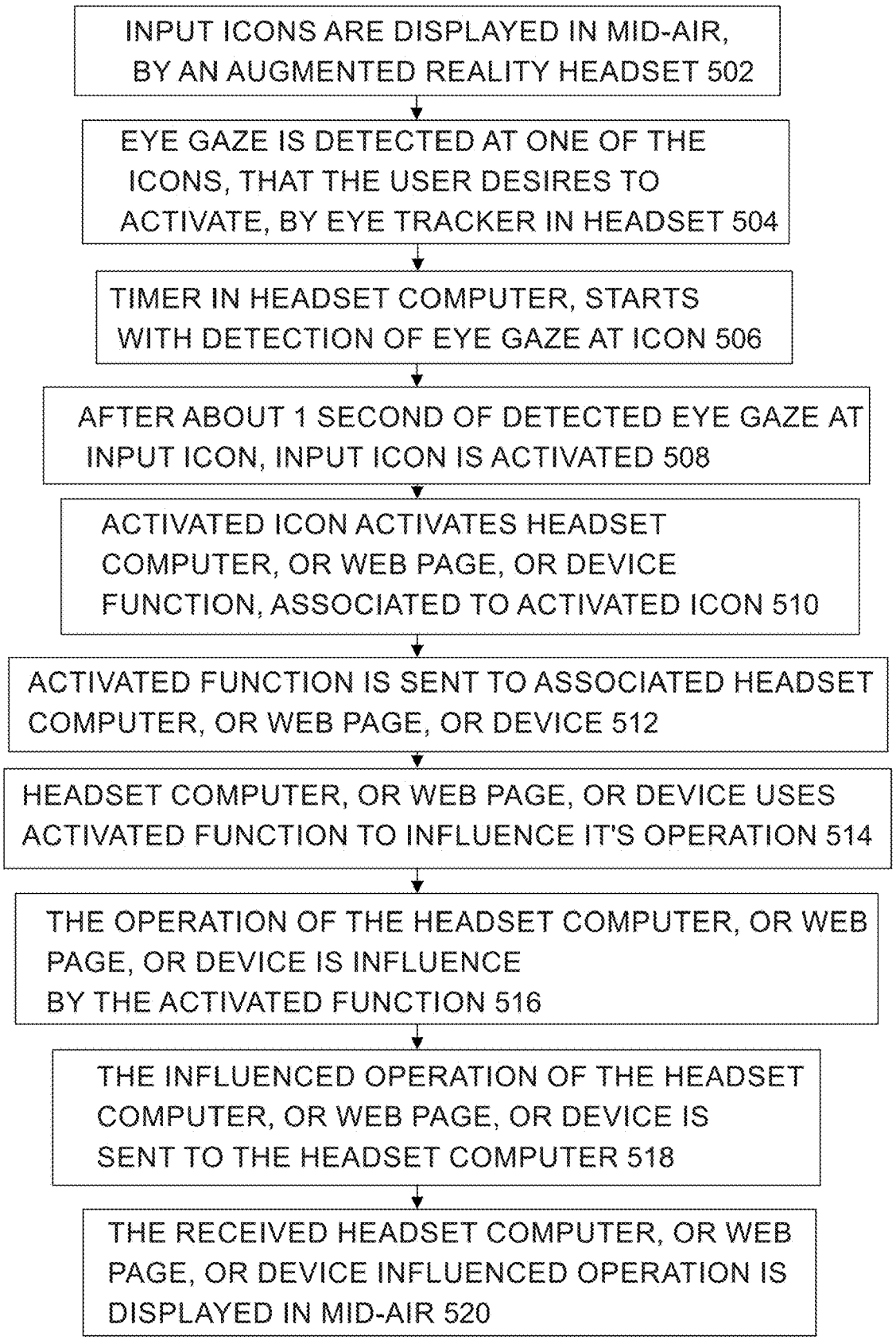
FIG. 10 depicts a software flowchart, of a user's operation of an eye tracking device in an AR headset's, and external devices.

A software flow chart, of gaze detected by the eye tracker used for activating input icons, is described in FIG. 10, input icons are displayed in mid-air, by an augmented reality headset 502, eye gaze is detected at one of the icons, that the user desires to activate, by eye tracker in headset 504, timer in headset computer, starts with detection of eye gaze at icon 506, after about 1 second of detected eye gaze at input icon, input icon is activated 508, activated icon activates headset computer, or web page, or device function, associated to activated icon 510, activated function is sent to associated headset computer, or web page, or device 512, headset computer, or web page, or device uses activated function to influence it's operation 514, the operation of the headset computer, or web page, or device is influence by the activated function 516, the influenced operation of the headset computer, or web page, or device is sent to the headset computer 518, and the received headset computer, or web page, or device influenced operation is displayed in mid-air 520.

Alternative Embodiments

Visual Feedback of Eye Tracker Input Device in an AR Headset Description

Figure 3:
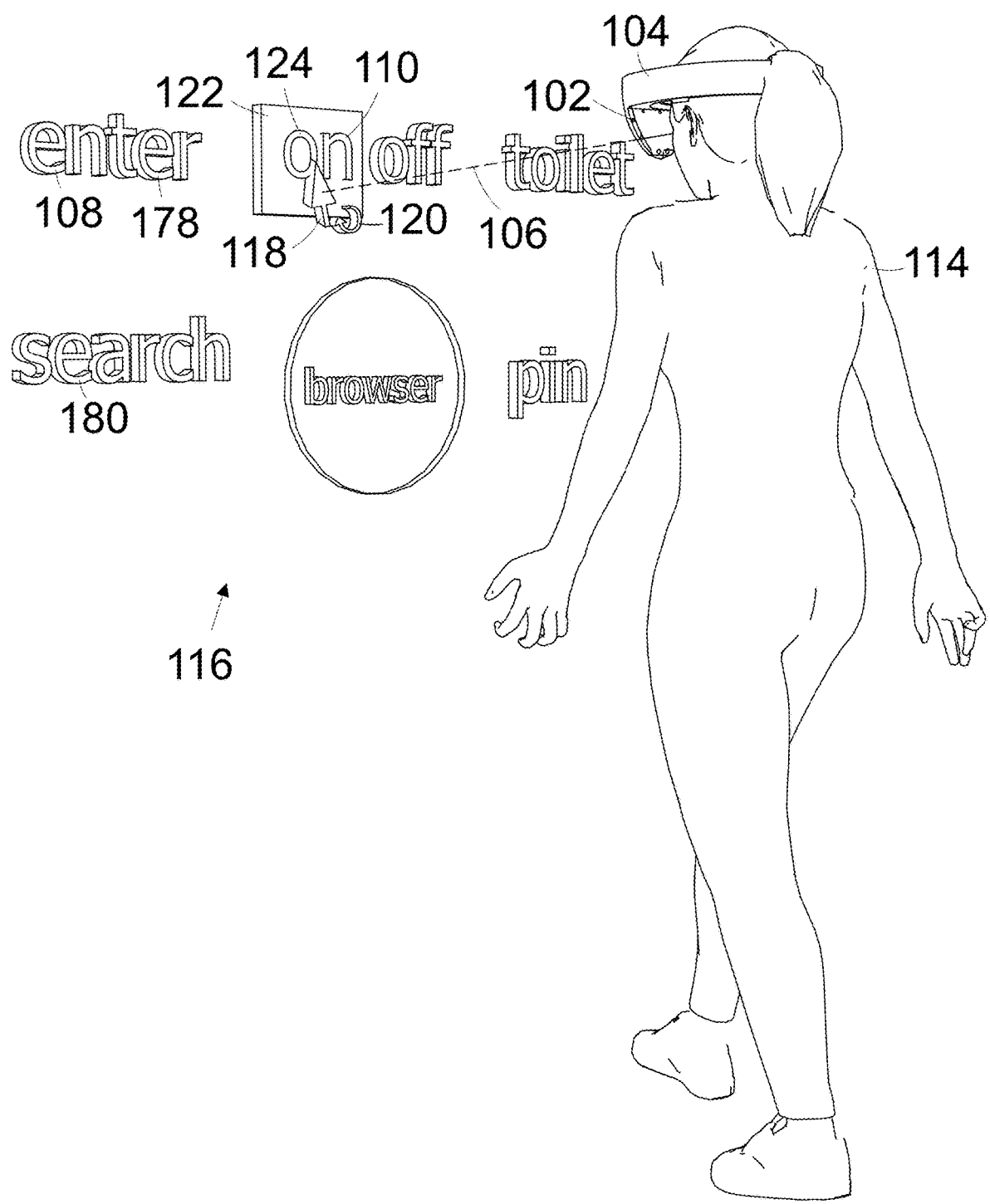
FIG. 3 shows a perspective view, of an augmented reality AR headset, having an eye tracking device, and a light switch displayed in mid-air.
Figure 4:
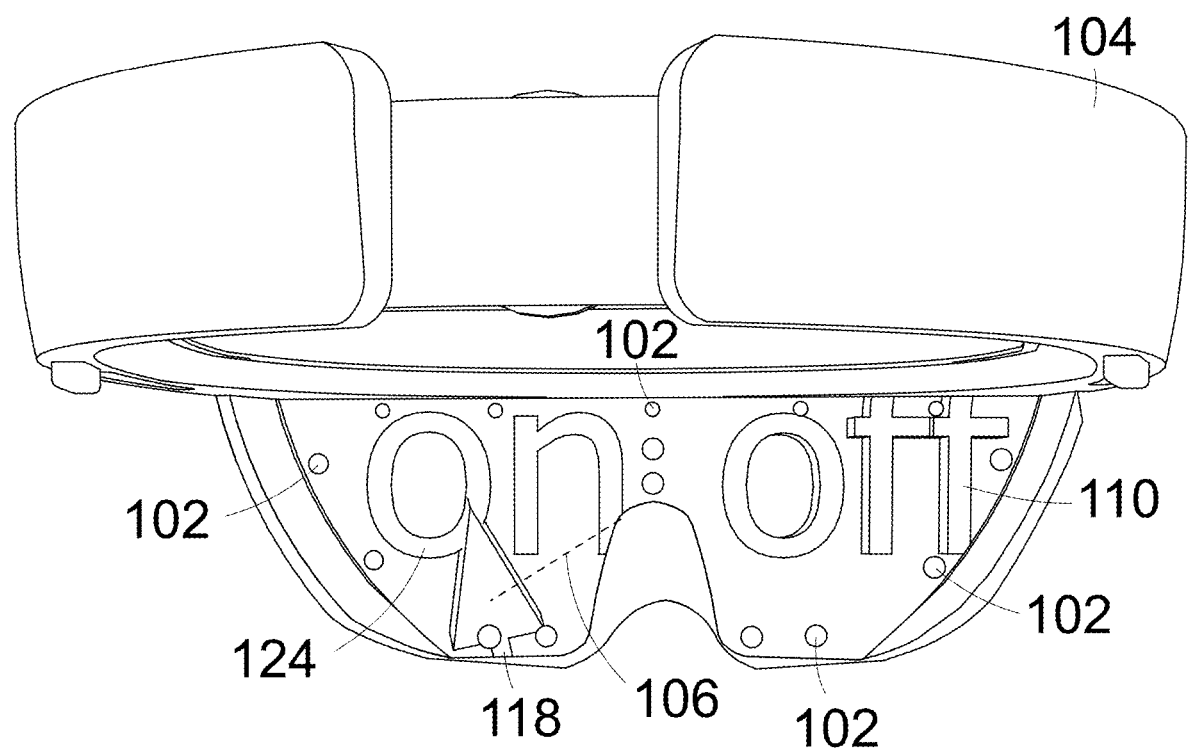
FIG. 4 shows a perspective view, of an eye tracking device in a AR headset.

An augmented reality headset 104 uses an eye tracking sensor 102, to track a user's eye gaze 106, as shown in FIGS. 3, and 4. The eye tracker is positioned in the headset, to view the user's eyes 114, as the user 114 views input icons 116, displayed three dimensionally 3D, in mid-air.

The eye tracker 102 connects to a computer in the headset 104. The computer is programmed, with eye tracking software.

Figure 5:
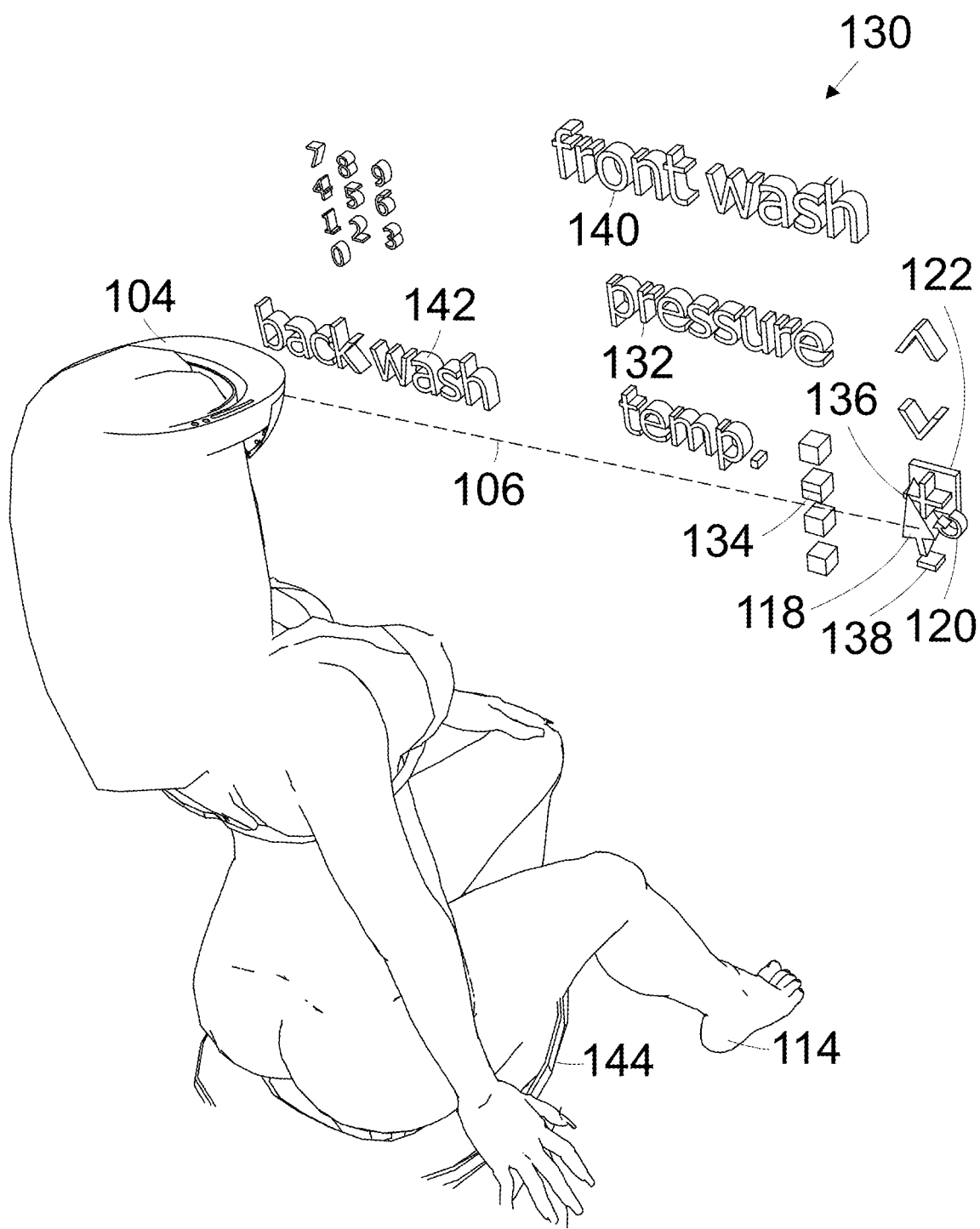
FIG. 5 shows a perspective view, of an AR headset with an eye tracking device, and augmented reality smart toilet input display.

The headset, augmented reality portable computer 104 displays images, on glass lens that the user views. The images create an optical illusion for the user, that the input icons 116, menu items, control panel, graphical user interface, are displayed three dimensionally, holographically, and or two dimensionally 2D, in mid-air, as shown in FIGS. 3, and 5. The input icons are displayed, in the user's surroundings. The cursor can be turned off so that it isn't displayed.

A Tool Bar to associate Inputs to Eye Gaze, Like Left Click

A tool bar is displayed, that has commands that are associated to the eye gaze. The commands include, right click, left click, double left click, scroll, zoom, keyboard select 212.

A command associated to eye gaze operates, when the user eye gazes at an icon, such as, the user activates the left click, so that eye gaze left clicks an icon, that is gazed at.

The left click command can be sticky, on continuously for the eye gaze, or a one-time left click. The left click command is activated, for one use, by gazing at the tool for 0.4 seconds. The activation of the one use left click is graphically displayed.

To have continuous left click operation, the gaze is continued past the display of the one use left click graphic, for a total period of 0.8 second. The activation of the continuous left click operation, is graphically displayed.

With continuous left click operation, input icons that the user gazes at for 0.6 seconds are left clicked. This activation method is the same for right click, double left click, and zoom, being associated to the eye gaze.

The amount of gaze time to active an icon, can be changed by the user, such as, the gaze can be 0.3, or 0.6 seconds to active the icon.

Figure 6:
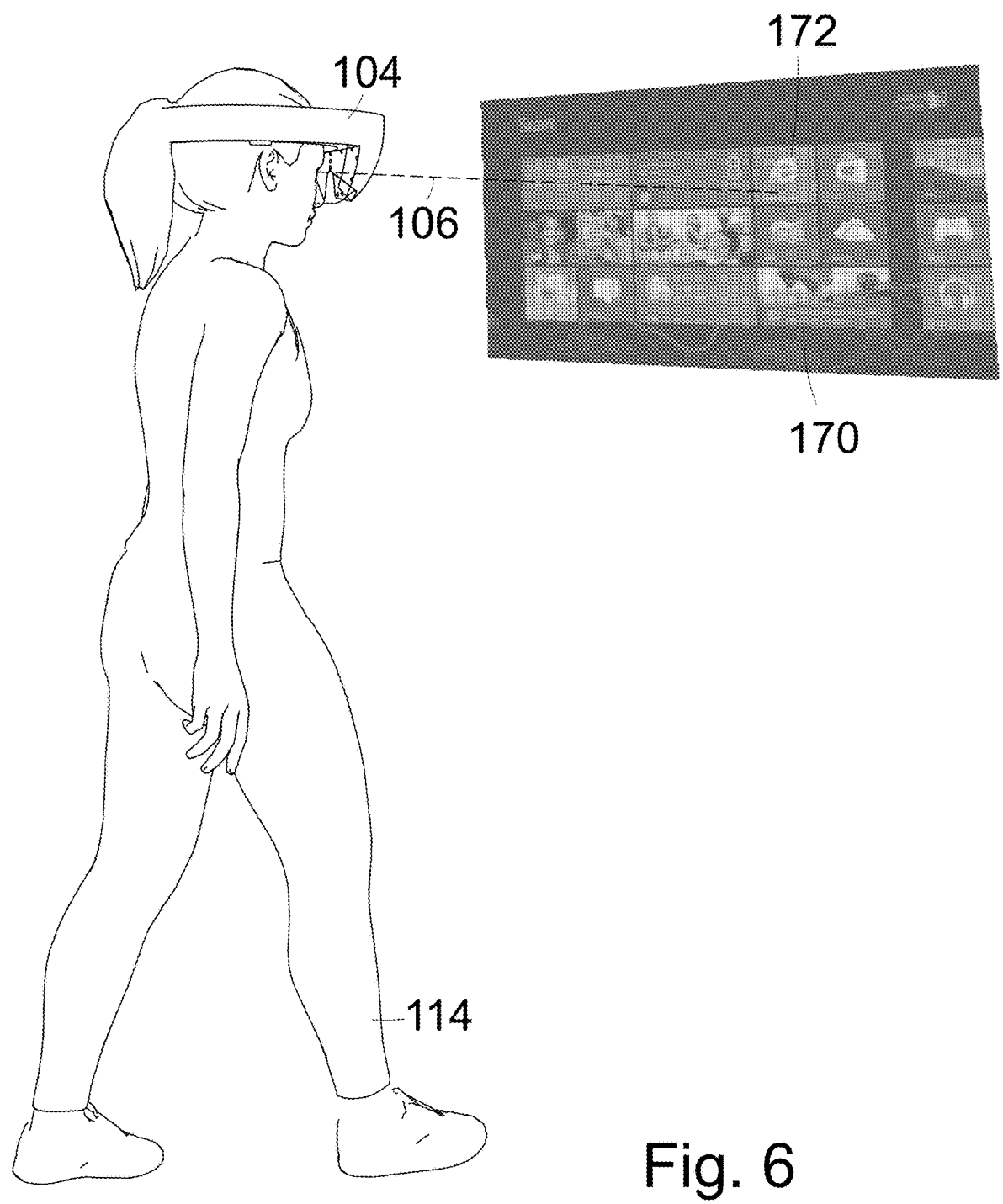
FIG. 6 shows a perspective view, of an in an AR headset with an eye tracking device, and input web page displayed in mid-air.

The Icons Can Operate Different Functions,

The icons can operate different functions, such as, an internet operation 112, a device operation, or computer operation, etc, shown in FIGS. 3, 4 and 6. The browser input icon 180 is used in internet operations, to display a web page 174, in FIG. 6. Input icons are displayed on the displayed web page 170, such as, an internet search operation 172.

The icons show computer functions, such as, an enter command 108, 178, FIG. 3. The icons show device functions 110, such as, an cony icon 124, which is used as part of a light switch, to turn on a light, FIGS. 3 and 4.

The continued gaze time, activates a timer, clock 120, at 0.4 seconds. After a time of 1 second, of continued gaze 106, the icon activates. The timer in the computer, counts to the 1 second. The timer is displayed next to the cursor, or the cursor can take the shape of the timer.

A signal that the icon has activated, is sent to the device, to operate a function of the device. The device receives the signal to operate the function of the device. The device uses the received function signal, to operate the device.

The headset 104 receives, and displays feedback, from the computer 104 in the headset, concerning the influence the activated computer function, has had on the headset computer.

The headset 104 receives, and displays feedback, from a device computer 104 in the device, concerning the influence the activated device function has had on the device.

Operation of an On Off Switch

For example, the eye tracker 102 detects the user's gaze at the light's, on off switch, on icon. The cursor moves to, and is superimposed on, the on icon. The on icon is highlighted 122.

The on icon 124, is inputted by the detection of the user's gaze 106, at the on icon, for a time of about 1 second. The 1 second time's progression, is show by the timer 120. The light is turned on, by the input of the on icon.

The headset receives information that the light has turned on. The headset displays that the light, has turned on.

Connection Between Headset and Devices

Figure 7:
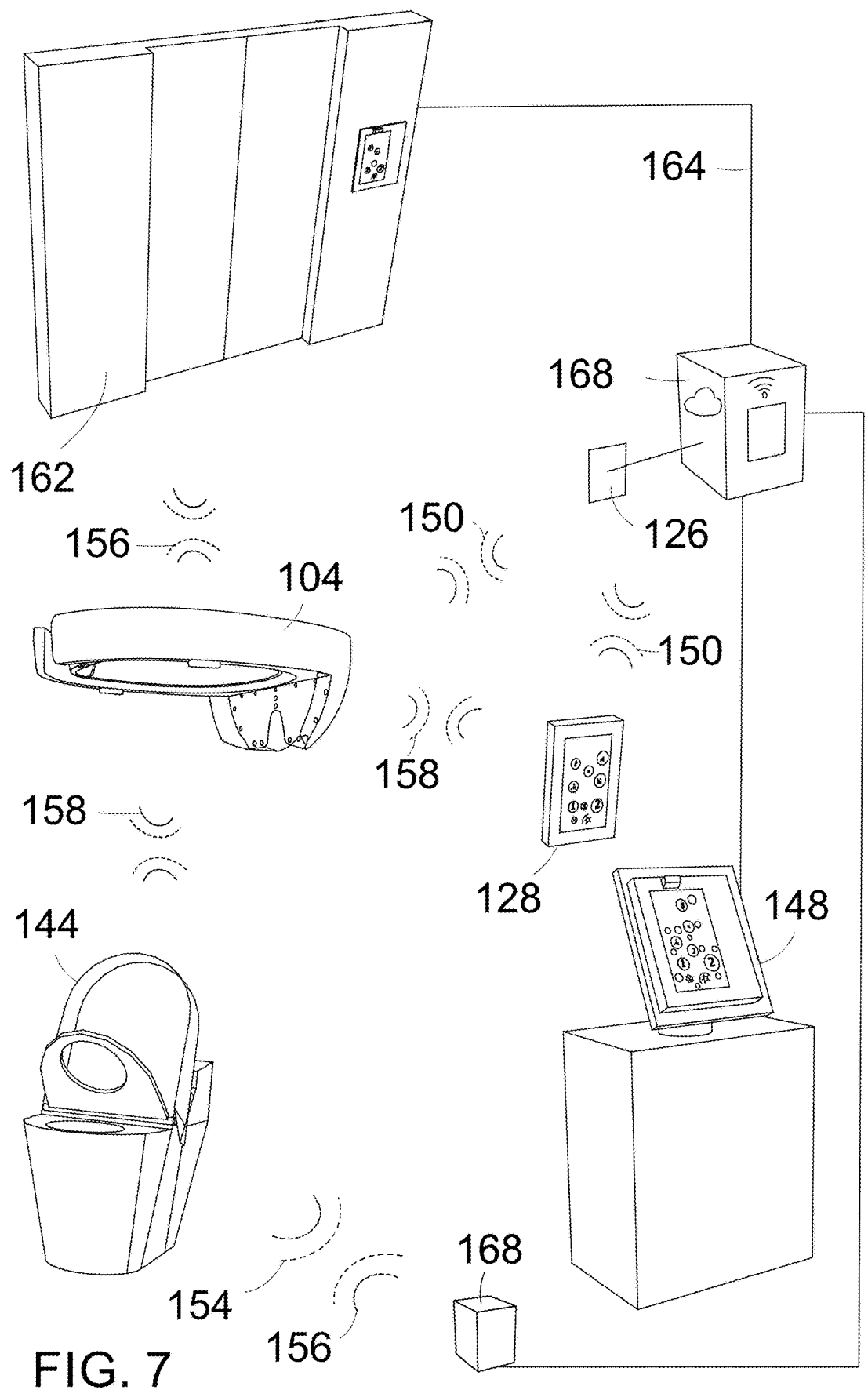
FIG. 7 shows a perspective view, of an AR headset with an eye tracking device, wirelessly connected to different devices.

The headset may connect to and communicate to differing external devices, as illustrated in FIG. 7. The headset uses a radio wave connection between the headset and the differing devices, and or an internet connection between the headset and the differing devices.

The headset can connect to devices, with the headset having a wireless connection to the internet, which can include, microwave cellular connection 150, to cellular towers 126, a WIFI connection 154 over a local Area Network (LAN) 156, Direct WIFI, Infrared light, and Bluetooth radio waves 158. The headset having radio wave transmitters, and receivers for each radio connection system.

The headset can connect to the internet, thru a WIFI router 168. With the headset router being is connected a server, which is connected to the internet.

The devices can connect to the internet, thru a router 168, and modem. The device router being connected a server, which is connected to the internet. The devices can use a wireless, WIFI, or wired connection to the router.

The headset can connect to a smart phone, cell phone 128, using Bluetooth radio waves 158, in FIG. 7. The phone connected to the headset, can connect to cell phone towers 126 using cell phone radio waves, or microwaves 150. The headset can access the internet, thru the phone's connection, to the cell phone towers.

The devices that connect the headset 104 can connect to the headset having a wireless or wired connection to the internet, which can include, microwave cellular connection, to cellular towers, a WIFI connection over a local Area Network (LAN), Direct WIFI, Infrared light, and Bluetooth radio waves. The headset having radio wave transmitters and receivers for each radio connection system. The devices, may include an elevator 162, the smart toilet 144, and a medical device 148.

Establishing a Connection Between Headset and Devices

The headset broadcasts that's its available for communication with a device, as illustrated in FIG. 7. The headset searches for devices that are broadcasting, that they are available to communicate with the headset.

The device broadcast that's its available, for communication with the headset, and searches for headsets that are broadcasting that they are available with the headset. When the headset, and device are in radio wave connection range with each other, they connect, and communicate with each other.

External devices broadcast their control panels, to different headsets. More than one headset can operate a device, such as, many user's headsets can input into the elevator control panel, at the same time.

When the user's headset, is in the vicinity of the external device. The external device's control panel icon, is shown on the headset's display. The control panel icon, indicates that the external device's control panel, it's available for downloaded to the headset computer.

When the external devices control panel is activated, the external device's control panel is download, to the headset's computer, and is shown on the headset display An Internet Connection Between the Headset and Device The headset can connect to external devices using the internet 164, as illustrated in FIG. 7. The device broadcasts over the internet that its available for operation.

The headset computer's location can be found using the headset's global positioning system GPS, or headset cell phone location, etc. The headset can be located on an internet map. The map includes the external devices locations on the map. The devices, such as, a vending machine can communicate with the headset, connecting with headset using an internet connection, using internet communication, and communicating over the internet.

The headset can be located on the map. The map shows the plotted location of the different external devices locations. The headset, and devices each has a location software that allows them to know each other's location on the internet map.

The headset's computer, and external devices location can be tracked and plotted, on the internet map, to determine when the headset is in the vicinity of the devices. The map is displayed, and viewed by the user Storage The computer readable medium may include non-transitory computer readable medium, for example, such as computer-readable media that stores data for short periods of time like register memory, processor cache and Random-Access Memory (RAM). The computer readable medium may also include non-transitory media, such as secondary or persistent long-term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, for example, or a tangible storage device.

These computer program instructions may also be stored in a computer-readable medium that can direct a computer or other programmable data processing apparatus, to function in a particular manner, such that the instructions stored in the computer-readable medium produce a function of a device, including instructions which implement the function act specified in the flowchart and or block diagram block or blocks.

The computer program instructions may also be loaded onto a computer, or other programmable data processing apparatus, to cause a series of operational steps to be performed on the computer, or other programmable apparatus to produce a computer implemented process, such that, the instructions which execute on the computer, or other programmable apparatus provide processes, for implementing the functions or acts specified, in the flowchart and or block diagram.

Computer

The computer in the external device, is used for processing, and implementing the information received from the headset, concerning the user's operation, and input of the device's operating menu on the headset. The received user input information, by the external device, is used in the operation of the external device.

The computer may further include on-board data storage, such as memory coupled to the processor. The memory may store software that can be accessed, and executed by the processor, for example. The host may be any type of headset computing device, that is configured to transmit data to the device. The host and the device may contain hardware, to enable the communication link, such as processors, transmitters, receivers, antennas, etc.

Communication Links

The headset may connect to the device, locally, over a network, or at a distant location over the internet. In the communication link is illustrated as a wired connection, however wireless connections may also be used. For example, the communication link may be a wired link via a serial bus such as USB, or a parallel bus.

A wired connection may be a proprietary connection as well. The communication link may also be a wireless connection, such as Bluetooth, IEEE 802.11 or other wireless based communication links. In another example, the system includes an access point through which the device may communicate with the internet. In this example, the device may not require connectivity to the host.

The access point may take various forms. For example, if the device connects using 802.11 or via an Ethernet connection, the access point may take the form of a wireless access point (WAP) or wireless router 168. As another example, if the device connects using a cellular air-interface protocol, such as a CDMA or GSM protocol, the access point may be a base station in a cellular network, that provides Internet connectivity via the cellular network.

As such, the device may include a wired or wireless network interface through which the device can connect to the access point. As an example, the device may be configured to connect to access point using one or more protocols such as 802.11, 802.16 (WiMAX), LTE, GSM, GPRS, CDMA, EV-DO, and/or HSPDA, among others.

Furthermore, the device may be configured to connect to access point using multiple wired and/or wireless protocols, such as "3G" or "4G" data connectivity using a cellular communication protocol (e.g., CDMA, GSM, or WiMAX, as well as for "Wi-Fi" connectivity using 802.11). Other examples are also possible. Alternatively, the host may also include connectivity to the internet, and thus, the device may access the internet through the host.

Headset Connecting to the Devices Through the Internet

The headset can communicate with the device through the internet. The headset having a cell phone transmitter and receiver, for connecting to a cell phone tower, and cell phone network. The phone network connects to a phone network server.

The device connects to an internet router, either wirelessly, or wired. The device router, connects to device server, on the internet.

The phone network server and device server connected to each other over the internet. The headset, and device each have a, compatible communication software. The headset connects to the device, over the internet. The headset, and device each have unique internet net addresses, that are used to find each other, and connect to each other.

The Headset has a Global Positioning System GPS

The headset has a global positioning system GPS, and the device has a GPS. The position of the headset, and device are plotted on a map on the server, such as, an internet map. The map determines the distance from the headset, to the device.

The headset, and or device, or both broadcast, on their servers, their availability to connect with each other. The headset broadcasts that's it's available to connect to the device, and the device being available to connect to the headset.

When the headset, and device are at a distance on the map, the device, and headset connect with each other through the server. The device sends its virtual control panel to the headset. The control panel is displayed. The user operates the device, by inputting into the control panel. The inputs into the control panel, are sent to the device.

The device uses the received inputs into its control panel, to effect, influence the operation of the device. The influenced operation of the device, is sent to the headset. The headset displays the influenced operation of the device.

Many Devices Control Panels Displayed by Headset

Many different external devices software, can download the to the headsets computer. Each devices software containing software for the devices control panel. The different devices, which are available to be operated, can be shown on the display. The user can input, which device they choose to operate.

Headset can Connect to Many Device Simultaneously

The headset can operate more than one device at a time. Two devices operating menus, can be shown on the display, at the same time. The user can input into the operating menus consecutively, such as, the user can operate a vending machine, then operate the room lights.

Programming

Computer program code for carrying out operations of the object detection, and selection mechanism may be written in any combination of one or more programming languages, including an object-oriented programming language such as Java, Smalltalk, C++ or the like and conventional procedural programming languages, such as the "C" programming language or similar programming languages.

The program code may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

Software

The headset and device use a compatible software language, a standardized software language, a communication software language to communicate with each other. The device and headset each have a respective computer, with a microprocessor connected to a storage. The computer in the headset is used for processing, the operation of the downloaded device control panel.

The headset, and external devices, have the computer communication software, that allows them to communicate and operate, with each other. The software allows for the transference, download of operating panel displays, from the external devices to the headset.

Operation Flowchart

The object detection and selection mechanism are described below with reference to flowchart illustrations and or block diagrams of methods, apparatus (systems) and computer program products according to implementations thereof. It will be understood that each block of the flowchart illustrations, in FIG. 12, and or block diagrams, and combinations of blocks in the flowchart illustrations and/or block diagrams, can be implemented or supported by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In addition, for the method and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive A software flow chart, of the eye tracker and AR headset, activating input icons, is described in FIG. 12, and includes, input icons, cursor is displayed on mid-air display by augmented reality headset 302, cursor's location is associated to user's eye gaze point's location, on the display, cursor moves with eye gaze point 304, eye tracker detects the user's eye gaze at input icons 306, activation of input icons, are associated to activation of computer functions of the headset, the internet, or functions of a device connected to the headset 308, user gazes at icon to activate icon, cursor contacts icon 310, icon is highlighted 312, as eye gaze continues at icon, a clock is shown next cursor, counting to about 1 second 314, at about 1 second of eye gaze, the icon activates 316, the activated icon, activates the computer function, or device function associated to the icon 318, the activated computer function, or device function, influences the operation of the computer headset, or device 320, and the headset receives, and displays feedback, from the computer, or device, concerning the effect of the influence on their operation 322.

Block Diagram of Connected Components

Figure 11:
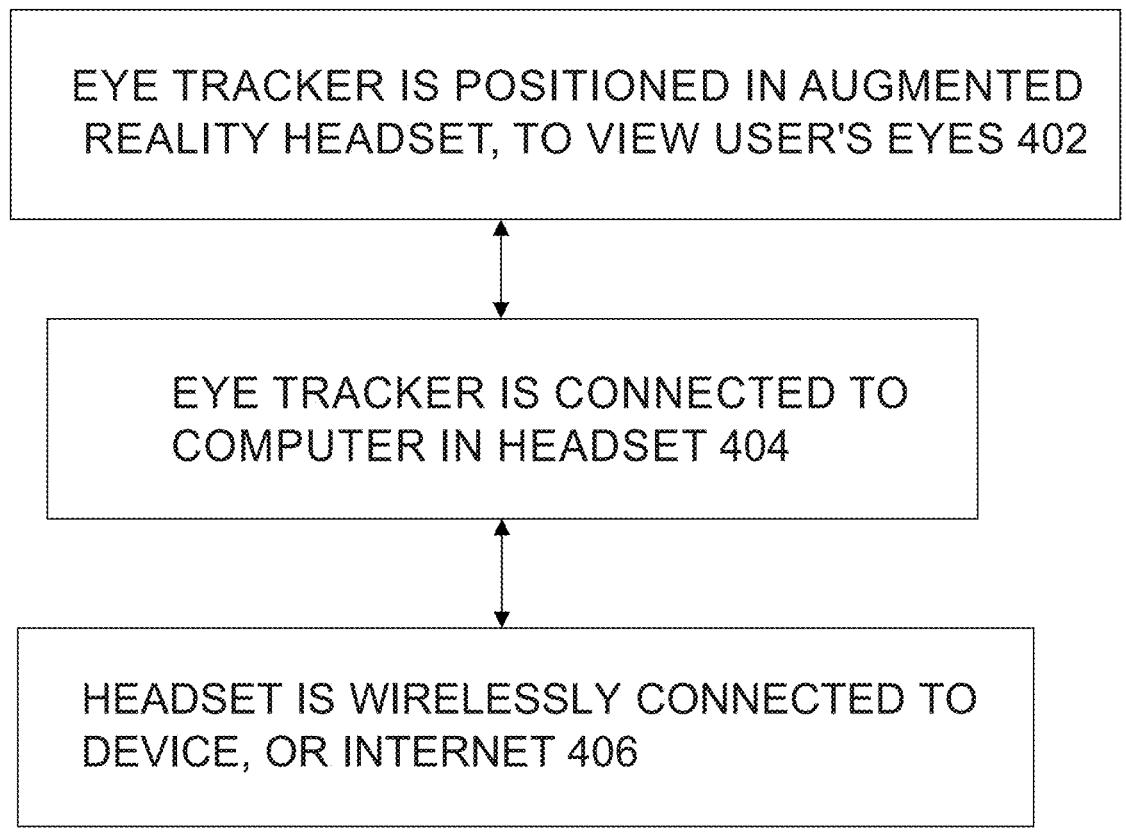
FIG. 11 illustrates a block diagram of hardware confections, between an AR reality headset having an eye tracking device, and external devices.

A block diagram of the connections, between the hardware components of the eye tracker, computer, device, or internet, is described in FIG. 11, which includes, eye tracker positioned in augmented reality headset, to view user's eyes 402, eye tracker connected to computer in headset 404, and headset wirelessly connected to device, or internet 406.

The Glasses Computer can be Used to Store Software

The glasses can keep and store the software which was downloaded from the device, to use with the device the next time the device is operated. The device can have a unique identifier, which is associated to its operating software, the identity can be used for the glasses to identify the device, and use the stored software for the operation of the device. The software can be stored in a profile of user settings, which are associated with the user, and or the elevator.

The Glasses Computer can be Used as Computer for a Device

The computer in the glasses, can be used as the computer, which is used to operate an elevator. Other devices that the glasses computer may operate include, smart toilets, and automatic teller machines ATMs.

User inputs into the ATM, may include, login pin number, deposit input, withdraw input, checking account selection, and menu, inputted by the user, the computer in the glasses connects to the device, and is programmed with software for the device it operates.

The glasses computer can have preprogrammed software to operate different devices, such as, elevators, vending machines, medical device, and self-serve gas pumps.

Visual Feedback of Eye Tracker Input Device in an AR Headset Operation

Example of AR Headset Used to Operate Multiple Devices, Including, An Elevator, An Internet Browser, And A Store Checkout Machine Elevator A user approaches an elevator 162. The headset connects to the elevator, as illustrated in FIG. 7.

The elevator's input icons are displayed in mid-air. The user gazes at one of the elevator icons. The icon highlights, a timer is shown next to the icon at 0.4 seconds, and show tie counting of time to 1 second, until the icon activates. At about 1 second the icon activates.

The activated elevator icon activates the elevator's control panel, to be displayed. The control panel shows an up button, or down button input icon.

The user gazes at an up button of the menu, and the up-button illuminates, and the elevator is called to the user's floor.

The user gets on the elevator, and a menu for the inside of the elevator is displayed. The inside menu shows, floor number options, 1, 2, 3, 4 floor numbers, and open door, etc.

The user gazes at the 3-floor button, and the button is activated, and the elevator moves to the 3 floors. The user stops the showing of the displayed menu, after using the elevator Internet Browser The user gazes at a web page browser icon 174, while on the elevator. A browser web page 170 is displayed. The user uses eye gaze to operate the browser, and search 172 the internet, for information, displayed on web pages, as shown in FIG. 6. Internet webpages can be displayed holographically, 3D or 2D, and interacted with by the user.

The user uses gaze at a virtual keyboard, and moves the cursor to the letters, numbers, and symbols, that they want to type. Continued gaze at the chosen letter, inputs the letter. The user enters letters to create words, that are then requested to be searched. The search results are displayed.

TV Show Web Site

The headset can access pay for movies, and TV shows, at on demand movies, and TV shows web sites. Gaze activates a move icon that is a short cut to an internet link for a on demand movie, and TV show site.

TV show icons are displayed, that describe the TV show they are associated to. The icons are activated by gaze. Gaze activates one of the icons. The activated icon displays, opens a displayed window, showing the TV show's contents of moving pictures, and sound. The user views the show contents.

Internet Banking

Gaze activates an icon after 0.6 seconds of gaze. Gaze is directed at a news icon, and the news is displayed. A user's accesses their bank web site page, by searching in the browser for their bank name, and activating search results for their bank, with gaze.

Gaze activates a displayed sign in icon on the page. Card number, and password input areas are displayed. Input into the card number, displays a virtual keyboard.

Gaze is directed at the first number on the keyboard that corresponds to the first number of the card, and the number is imputed into the card area. Gaze inputs each number of the card in the card area. The virtual keyboard for the password is displayed and gaze inputs the numbers, and or letters of the password. When the number, and password area are filled into the areas, a continue icon is activated by gaze. The activation of the continue icon, opens a page where the user's account balances are displayed, which include, checking account, savings, credit card, loans, investments balances.

Make a payment, and a transfer funds icon is displayed. The payment icon is activated with gaze. Pre-entered billing companies entered by the user are displayed. A bill to be paid input area is activated. Gaze at the keyboard enters an amount of 18 dollars, into the bill to be paid input area. A verify payment icon is gaze activated. The funds are sent electronically, to the company from the user's account, over the internet. Gaze actives a sign out icon.

At an internet web browser site, gaze is directed at a Weather icon, the icon is activated, the weather temperature, and precipitation amounts are displayed.

Smart Toilet Example

The user operates a smart toilet 144, having an electronic bidet, as illustrated in FIG. 5. The bidet's operating menu 130 is displayed. The menu shows input icons, whose functions are associated, to operations of the toilet. An activated icon input, operates the associated toilet device. The menu shows input options such as, front wash 140, back wash 142, water temperature settings warm water 134, water pressure 132, water pressure increase 136, or water pressure decrease 138.

The user uses eye gaze 106 to activate, a back wash setting 142, a warm water temperature setting, and increases the water pressure, and a start icon.

The bidet starts the directing of warm water, at the user's back position. The toilet's display, shows the operation of the toilet.

Store Checkout Machine Example

The user goes shopping at a store. The user checks out, at a self-serve check out payment station. The cost of the products, is displayed in mid-air.

To pay for the products, the user gazes at their displayed, debit card, credit card, or electronic commerce company account, to open the payment system. The user inputs their personal identification number, or password, using a displayed virtual keyboard, or number keypad. The user gazes at the desired letter, or number to activate, and input them.

The user opens their electronic commerce account, and transfers funds from their account to the machine. The machine accepts the funds. The machine shows, that the user has paid for the products.

Eye Gaze Used to Avoid Touching Bacteria on A Light Switch

The headset may reduce the spread of anti-biotic resistant bacteria, when used to operate devices, such as, light switches, by using eye gaze. The user doesn't need to touch physical control surfaces of the devices, to operate them, as illustrated in FIGS. 3 and 5.

The surfaces may have bacteria, or viruses on them. The bacteria can be transferred to the user's fingers, infecting the user, and possibly causing illness.

Eye gaze operation of the switch, limits the bacteria, or viruses on hands, which limits the amount of bacterial transmitted from hands to surfaces, and from hands to other people.

Touch input devices, that are used by many users, may accumulate harmful bacteria, from users touching input buttons. The bacteria may spread, to the users touching the buttons. Examples of multi-user devices include, a smart toilet, an elevator, and automatic teller machine.

A Light Switch

A light switch is wirelessly, connected to the headset. The light switch is connected to a light. The light switch control panel, has input icons, and is displayed in mid-air, by the headset. The icons include, a light off, or lights on icons, and a light dimming option.

The eye tracker detects the user's gaze, at the off icon. The off icon is inputted, by the detection of the user's gaze at the off icon, for a time of about 1 second. The light is turned off, by the input of the off icon.

Self-Driving Car

The user can find a self-driving car's location, on the map. In the car, the headset connects to the cars computer. The user views vending machines on the map. The headset plots a route to a chosen machine. The user activates the route with eye gaze. The car follows the activated route to the machine's location The user views an icon representing the machine on the map. The user's gaze of 0.5 seconds at the icon, actives the machine icon. A displayed directions icon is gaze activated. The activated directions, show different routes to the machine. Gaze then actives the chosen route. The user gazes at a displayed start car route icon. The route icon is activated. The activated route icon, starts the car driving to the machine.

Flammable Vapor Environment Device

When the user's headset 104, is in the vicinity of a flammable environment device. The headset wirelessly detects the device, and communicates with the device. The device control display panel icon, is downloaded to the headset's display 116. The downloading of the icon, indicates that the device is available for operation.

The headset may connect to, and communicate to different external devices, using a radio wave connection between the headset and the differing devices, and or an internet connection between the headset and the differing devices.

The user sees a flammable environment device icon, with a description of the device, associated with the icon. The user touch activates the icon with eye gaze. The activated icon displays a control panel menu. The menu includes icons show differing functions, associated with operations of the device.

The user operates the device using eye gaze to activate differing icons, associated with differing functions of the device.

The headset control panel, can reduce the problem of static electricity, in a flammable vapor environment. The user may create a static electric discharge, between the user's finger and an external device's display panel. The electric discharge, may ignite air borne flammable vapor or material.

Using the eye gaze 106 to operate the device, reduces the need to touch the physical external device display, to operate the device. Using the headset in flammable environments, may be aid in reducing the chance of ignition of air borne flammable vapours or particles.

Airborne flammable vapor or particles may be present in the air, in locations, such as, silos with grain dust, petroleum refineries, and paint plants, etc. The flammable environment device could be a, gas compressor, an elevator, and a computer keyboard.

Computer Functions Activated by Input Icons Associated to the Device Example

The headset has a speaker 127 and microphone. The user can make internet video calls. The user can search the internet, by interacting with the display 116, in FIG. 6. The user can search the internet 172, with an internet search engine, or browser. The search results are displayed, on the display 104.

The user can surf the internet, view internet web pages 174, watch internet TV, view internet content, view, and listen to internet videos. The user may verbally chat with people, using the internet connection.

Devices Activated By Eye Gaze Input Icons Associated To The Device

The headset can connect to, and operate electronic devices, such as, gas station gas pumps, a medical device, a store checkout station, a smart toilet remote control, an elevator, a vending machine, a ATM, a flammable environment device, public interactive devices, a door lock, a car lock, a car ignition, a room temperature thermostat, apartment lights, hospital devices, such as, hospital elevators, or ex-ray machines, and a microwave oven. The headset, can find a car in a parking lot.

The headset can used to operate, virtual keyboards, library keyboards, shared workplace keyboards, gym athletic equipment interactive display screens, computer games, hotel TV remote controls, hospital bed control panels, and public computer terminals that use a keyboard.

Public interactive device may include electronic devices, such as hotel doors locks, space station devices, flammable environment devices, elevators, and space station devices.

The user can play online computer games, such as, online internet role playing games. virtual worlds, and computer games Automatically Display Device Control Panels The glasses headset maps the room, the location of the physical control panel of the device, and the device. The display shows the holographic, 3D control panel, which operates the device. The 3D control panel is 1 meter, from the devices physical control panel.

The user can change, and set the location, and distance the 3D control panel, is from the devices control panel. The 3D control panel can be operated independently of the devices location, for example, an elevator call control panel, can be operated 5 meters for the elevator control panel, and out of view of the physical panel. The user can call the elevator, using the 3D call panel. Some devices can rely solely on the 3D panel for operation, without having a physical touch screen input control panel.

Many devices 3D menus can be displayed within close proximity to each other, in the same room, such as, a vending machine menu, an elevator call button, and an automatic teller machine.

Vending Machine

A vending machine menu displays food, chips, drinks, candy for sale. The user gazes, at the displayed chips icon. The gazed at icon activates. The user pays for the chips, by opening their electronic commerce account, and transferring funds from their account to the vending machine. The machine accepts the funds, and delivers the chips.

The user can also pay, the vending machine, with funds having been downloaded to the headset, and which are displayed on the headset, and are gaze inputted, and sent to the vending machine.

Space Station Devices

In a space station's dry air environment. The user may create a static electric discharge, between the user's finger and a physical display panel, that is used to operate a device. Static electric discharge is reduced, by not touching the physical input panel. Eye gaze allows a device, to be operated without needing to touch, the physical display panel.

A space station's devices, can include a variety of devices, such as, a space station robotic operating arm control panel. A mid-air displayed option to operate the arm Left handed, or right, can be input with eye gaze. A space station toilet, a medium toilet water temperature setting, can be displayed and inputted.

The headset's operation, can be described as a universal mobile input device, for operating different devices. For example, a space station headset can operate, the space station moving arm, and then in a different input configuration, the headset can operate a station camera mover. The headset operates many devices, without the need of having two, or more different physical input devices.

The headset can save space, by allowing to the control panel to be virtual, without need for a physical control panel. The headset can have control panels, for different devices, saving the space needed for the physical different panels.

Gas Pump

The user uses the interactive input icons displayed on a display, to operate a gas pump. The user can activate the icons, by gazing at displayed icons. The user gazes at gas pump input icons, to choose the octane of gas, or pay for the gas. The activated icons, are associated with the operation of the pump, and gas pump functions, such as, delivery of gas, or payment of the gas. The headset receives feedback information, while the device is operating, such as, how much gas is being pumped.

Door Lock

The headset screen 412 can show a door's unlock options, such as, yes 414, or no. Using eye gaze to activate a yes, wirelessly 410 signals, the door to unlock. The lock could also use a pin number, to unlock the lock. Entering the pin number, would unlock the door. With the door unlocked, the user has the option of locking the door using a shown, lock door icon on the display.

A car menu shows, a start, or stop engine options. Gaze activates either stop or start icons, which activates the associated functions of the car. A preferred car seat temperature icon, can be displayed, and inputted. The user operates the room temperature icon, by gaze activating, a desired temperature number shown on the headset.

Room Thermostat

Room temperature can be controlled by eye gaze. The headset display can show a thermostat, whose temperature can be raised or lowered. The user operates the room thermostat, by gaze activating, the desired thermostat's temperature number shown on the headset.

Radio

The eye gaze headset display operates a radio, by using the radio's displayed operating menu, such as, FM or Am channel selection, and volume control, increase or decrease volume.

Microwave Oven

The headset operates a microwave oven, using the displayed operating microwave oven operating menu, such as, cooking time, and heat power setting percentage.

Automated Teller Machine ATM

An ATM display input panel appears. The panel shows a menu, of the ATM's operations, that can be activate by the user.

The headset receives feedback information, while the device is operating, about the ATM, such as, the amount of funds deposited, account balances, etc.

With more than one ATM, the ATMs physically show numbers, that correspond to ATM numbers on the headset display. The user chooses the numbered ATM, such as, 1, and activates the same displayed number 1, associated ATM icon.

The activated ATM icon input, operates one of the function of the ATM. ATM functions include, user cash deposits, cash withdraws, and other banking transactions.

Laptop

The eye gaze headset display 416, can operate a laptop computer. The laptop input display is shown on the headset display 412. The laptop display shown on headset display can operate the computer, in a similar fashion as the display on the computer would operate the computer.

The user gazes at the computer display icons on the headset display, which operates, and inputs data to the laptop computer. The headset display is connected to the computer, using and internet connection, the user can surf the internet, and operate other computer applications. The laptop is connected to the internet.

Television

The eye gaze headset display operates a TV, by using the TV's displayed operating menu, by using the TV's displayed operating menu, such as, channel selection number, and sound volume control, increase or decrease volume.

Machine in A Dust Free Environment

Eye gaze input may be beneficial, in a dust free environment, such as, in microprocessor fabrication environments. The headset doesn't have moving parts. Physical key boards have moving parts, whose movement may create friction with each other, which can create dust.

When a finger or glove touches a physical input surface, to input, the touching of the finger to the surface, creates friction between the finger and the surface. The friction causes particles from both surfaces to detach from the surfaces, and become airborne. The particles then descend to a surface, which creates dust on the surface. Dust on the surface of a microprocessor, may have a negative impact on the microprocessor's production.

A headset keyboard is displayed in the dust free environment. A on off switch displayed. The headset is connected, to a microprocessor fabrication machine.

MR reality glasses are used in the dust free environment to input into a control panel in the environment, to operate a device.

The user views the different hologram button inputs. Each button is associated to a selection, of one of a variety of operations of one of the devices, in the dust free environment, such as, the computer, or microprocessor fabrication machine. The user chooses a hologram, to select the desired device operation.

The user can turn the device on or off, by gaze inputting, either on or off hologram.

Different Types of User Input to Operate a Device Eye Tracker Input

The user gazes at, one of the mid-air input buttons, which will input the button. The user's eyes gaze is detected, by an eye tracker device, which is positioned in the headset, to view the user's eyes. The eye tracker sensor, is connected to the computer in the headset. The sensor sends the eye tracker input, to the processor. The user can input one of the mid-air input buttons, by using the eye gaze of their eyes.

Mind Thought and Gaze Input

The user can input one of the mid-air input buttons, by using their thoughts. The user's thoughts generate electrical signals, which are detected by a mind thought sensor. The sensor is connected, to the computer in the headset. The sensor sends thought input, to the computer. The users' thoughts can be associated to inputting, left clicking the buttons. The user uses their thoughts, to activate a choose highlighted input button.

Mid-Air Touch of an icon To Activate an Icon

Mid-air touching a displayed icon, by moving a finger to the location of the icon, activates the icon. A touch camera in the headset detects the finger occupying the same space as the icon. The detected touching of the icon, left clicks, and activities the icon.

Eye Gaze and Hand Gesture Input

Mid-air touch input, can be used to active the displayed input icons. The user gazes at the icon that they want to activate, and uses a hand gesture, like lifting a finger up and down, to left click, and activate the icon.

An outside camera is connected to the headset computer. The outside camera is part of the headset. The outside camera views the user's fingers.

Voice Recognition

The user can verbally, input one of the mid-air input icons, or letters of the mid-air display menu, by verbally describing one or more of the displayed mid-air input icons, or letters. Voice recognition detects the icon being described, such as, saying the number 5, activates a number 5 icon. The 5 icon is associated, to the number 5 word.

Mid Air Touch of An Input Icon

The user can touch an icon in mid-air, and the touch activities the icon. An outside camera is connected to the headset computer. The outside camera is part of the headset. The outside camera views the user's fingers.

Augmented Reality

Augmented reality, is a live, direct or indirect, view of a physical, real-world environment whose elements are augmented by computer-generated sensory input such as sound, video, graphics or Global Positioning System GPS data.

Alternative Embodiments

Blinking to Activate Icons while Eye Gazing at them Description

Figure 8:
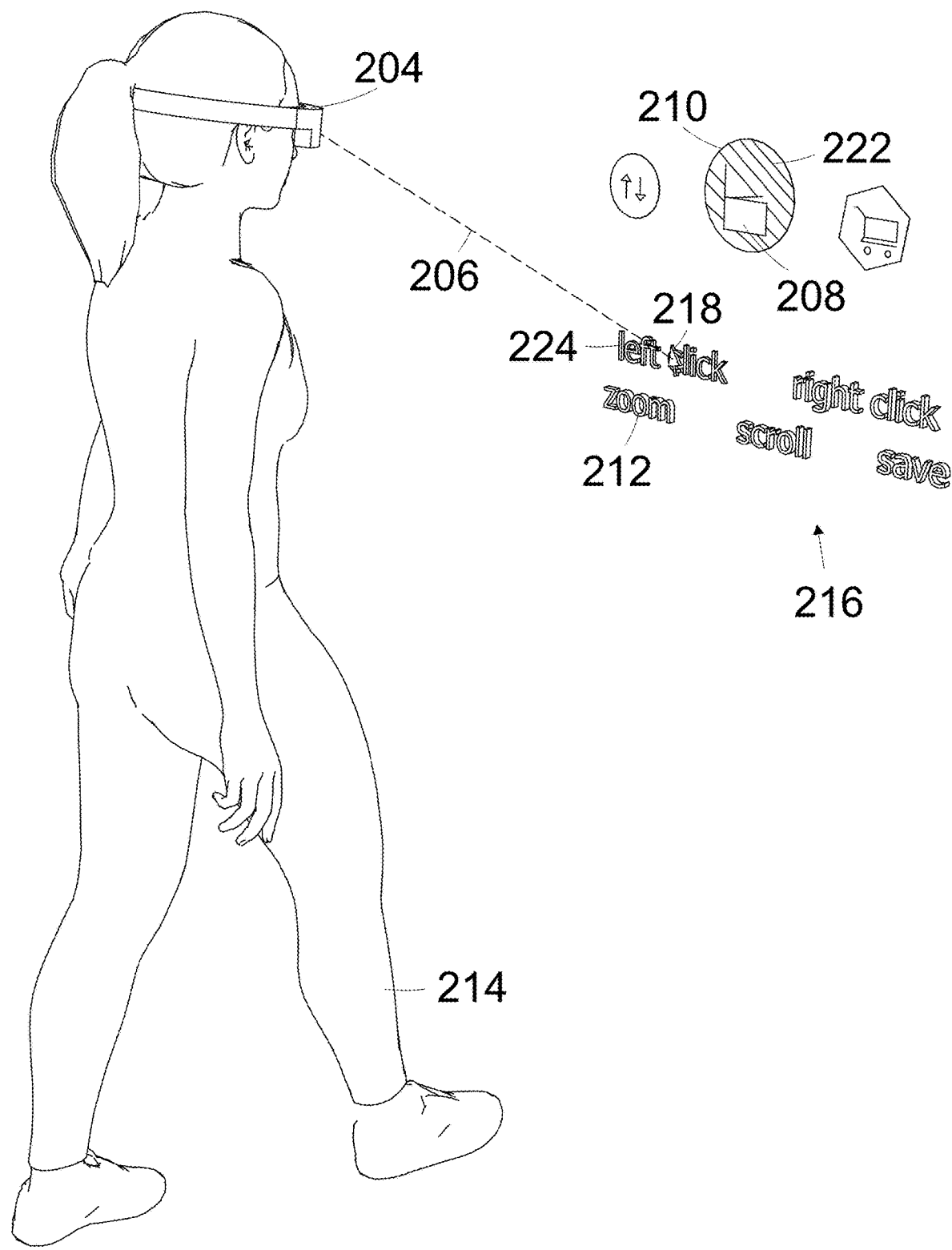
FIG. 8 shows a perspective view, of an AR reality headset having an eye tracking device, and an augmented reality input display displayed in mid-air.
Figure 9:
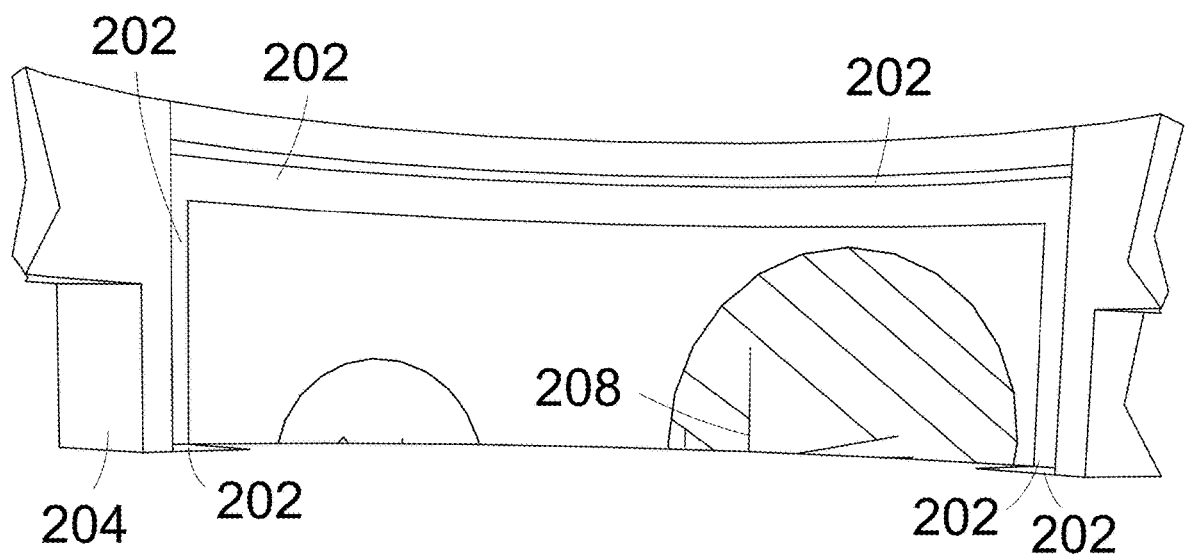
FIG. 9 shows a perspective view, of an eye tracking device in an AR headset.

An augmented reality AR glasses headset 204, has an eye tracking, and eye gesture recognition sensor 202. The sensor is connected to a computer in the headset, as shown in FIG. 9. The eye sensor is attached to the glasses, and views a user's eye or eyes, as shown in FIGS. 8, and 9. The computer is programmed with eye tracking software.

The headset could also be a smart glasses having an eye tracker. The smart glasses can active input icons, with gaze at the icons, displayed on the glasses lenses, and viewable by the user.

An input panel 216 is displayed on the glasses lens. The input panel is viewed by the user. The view of the panel, appears to the user, as being displayed in mid-air.

A cursor 218 is display, with the input icons, as shown in FIG. 8. The displayed icons, can be in 3D 212, or two dimensionally 2D 210.

Blink A Tool Bar to associate Inputs to Blink, Like Left Click

A tool bar is displayed, that has commands that are associated to the eye gaze blink. The commands include, right click, left click, double left click, scroll, zoom, keyboard select 212.

A command associated to eye gaze blink operates, when the user eye gazes at an icon, such as, the user activates the left click, so that eye blinking, left clicks an icon, that is gazed at.

The left click command can be sticky, on continuously for the eye gaze blink, or a one-time left click. The left click command is activated, for one use, by gaze blinking at the tool one time. The activation of the one use left click is graphically displayed.

To have continuous left click operation, gaze blinking at it activates continuous left click tool. The activation of the continuous left click operation, is graphically displayed.

With continuous left click operation, input icons that the user gaze blink's at, are left clicked. This activation method is the same for right click, double left click, and zoom, being associated to the eye gaze.

Blinking to Activate Icons while Eye Gazing at them Operation

The user looks to the icon, that they want activated. The cursor follows the user's eye gaze 206, and moves to the icon, they are looking at. The icon highlights, when the cursor contact the icon, as shown in FIGS. 8, and 9. The user left clicks the icon by blinking their eyes. The blinking left clicks the icon. The user can blink, with one eye, or both eyes.

The user chooses toilet menu options, by positioning the pointer over the desired menu option on the display. The user blinks, and the icon is left clicked, and the back-wash icon 208 is activated.

The activation of the icon, is associated to activating the device function, associated to the icon. The computer sends the device, the activated device function. The device actives the device function of the device, with the received activated device function.

Talking Icons

The holograms can move, change shape, and be animated, for example, the hologram can be, a moving, and talking, cartoon character, such, as bugs bunny, or Lisa Simpson. A speaker in the glasses, can broadcast, the characters talking. The speaker is connected, to the computer in the glasses.

The talk, or vocalizations of one of the characters, can describe the input button's function, that the character is associated to, such as, the character can say, 'I can increase, the water temperature'.

The user can identify each hologram, by identifying each hologram from each other hologram, by visually having each hologram be different from each other hologram.

Sound Feedback

Sound can be associated to the gaze of each icon, such as, a bell note, music, a cat's meow, and a chime. Sound can be associated to the activation of the input, such as, a piano note. The sound is broadcast, from the speaker in the headset.

The sound lets the user know that they have been gazed at, and or activated the icon. The user can set, and input the sounds associated to the icons An Example of Headset Operation The headset 204 is connected to a smart toilet. The smart toilet's operating input icons, are displayed. A 2D back wash smart toilet icon 208, 210 is displayed.

The user looks at the backwash icon. The cursor moves to the icon. The backwash icon highlights. The user blinks while looking at the icon 224, and the toilet icon is left clicked, and activated.

The activation of the back-wash icon, is associated to a command, to activate of the back-wash function of the toilet. The computer sends the toilet, the activated back wash function to the toilet. The toilet actives, the back-wash function of the toilet. The user is washed, with the toilet back wash, as they sit on the toilet.

Hand Gesture and Gaze for Fast Food Self Serve Restaurant Kiosks Description

A fast food self-serve order restaurant has a kiosk with a display. The display shows, restaurant food and drink menu item, and payment options. The kiosk connects to a AR headset with eye tracker. The headset displays the menu on a menu display in mid-air.

The eye tracker views a user's eyes, when they look at the display. The eye tracker views, and tracks, the user's eye's gaze.

The Restaurant's Menu

The restaurant's menu, includes, hamburgers, cheese burger, pepperoni pizza, ham pizza, slice of cheese pizza fried chicken leg, french fries, fried chicken breast, bean burrito, beef burrito, salmon sushi, scrambled eggs, hot dog, chili, chicken sandwich, fish sandwich, beef wrap, pork fried rice, shrimp and noodle, salad, egg breakfast, sandwich, salad with chicken, baked potato, meatball submarine sandwich, chicken soup, chocolate donut, coffee, ginger ale, coke, orange soda, milk, and water.

Gaze Operating the Menu Display

Each menu item has a picture icon, that is a picture of the item, such as, a beef burrito icon is a picture of the beef burrito. The menu food, and drink icons are inputted by gaze, into an order associated to the user. Items in the order can be remover by gaze inputting the item in the order, which displays a check mark next to the item. The user gazes at a remove item icon, and the check marked item is removed from the order.

Self-Serve Restaurant Payment

The eye display shows order payment menu input icons, that include, a cash payment, credit or debit card payment. A total products price amount area is displayed.

The user views the different input commands, on the eye display, such as, a ten-key number pad, amount of purchase, accept purchase amount, enter, and credit card number.

The user inputs numbers into the display pad, by individually gazing at one of the numbers, such as, a number 2. The numbers can be entered, to input a debit card, or credit card pin number into the computer. The input can be shown on the display.

A credit card can be read, by a credit card reader, at the station. The credit card can be read by opening the user's financial account, such as, bank account, electronic commerce (e-commerce) company account, debit card, credit card account over the internet, and paying from the account. The computer inputs a PIN number, inputted by the user.

The payment information is displayed on the display can be used as, a self-serve checkout display, where the user checks out their own purchases. The payment display can also be, a served checkout payment display, where an employee of the restaurant, checks out the user's food or drink purchases, and accepts payment for the purchases.

The data inputted by the user into the eye display, is displayed on the display. The displayed data keeps the user informed about the payment stations operation, and interaction with the user. The user can use the displayed data, to adjust the operation of the payment menu, such, changing a personal identification number PIN number if a first number is incorrect.

Connections Between Headset and The Store Computer

The headset computer connects to the restaurant computer, which is connected to the kiosk. The restaurant computer connects to a restaurant employee display.

The headset computer has computer operating software, and eye tracker operating software. The headset computer operates the AR display, and the eye tracker. The restaurant computer operates the menu and payment menu.

Restaurant Employees Viewing the User's Order

The menu items inputted by the user into the headset display, are sent to the restaurant display. The restaurant employees view the user's order. The employees prepare the ordered food. The prepared food can be picked up by the user, or delivered to the user's table.

Transference of bacteria from the payment station touch control panel is reduced, by using the eye menu control panel to order food.

Hand Gesture and Gaze for Fast Food Self Serve Restaurant Kiosks Operation

The user uses gaze to activate, the start order icon. The items that the user orders are part of the order. The order is assigned to the user, with a number, or a picture of the user taken by a picture camera in the display. The order is viewed by the employees.

The user uses their eye gaze to activate the displayed icons, that they want activated. The user gazes with their eyes at the one of the displayed icon items, that they want to activate, such as the cheese burger input icon, for a set amount on time, such as, 0.6 seconds.

At the start of the user's gaze at an item, a small clock (not shown) is shown next to the gaze point on the display. The clock reassures the user, that the item is in the process, of being activated by the user's gaze. At the 0.6 seconds of gaze time, the cheese burger icon is clicked, and activated. The activated cheese burger, is put on the user's order.

The user can active another icon command, after the first command is activated, etc. Other commands include, a cancel icon, and the number 2 input number. The user completes their order, and gazes at a finish and pay icon. The user pays with the credit card, and waits for their order to be prepared.

Hand Gesture

A Hand gesture camera is connected to the headset computer. The computer has hand, and finger gesture recognition software. The finger camera is part of the headset. The finger camera views the user's fingers.

A cursor is displayed with the input icons. The cursor follows the user's gaze. The gaze moves the cursor to an icon. The finger is moved up or down quickly, to left click, and activate, the icon, contacted by the cursor.

The cursor contacts the ham pizza icon on the display. The ham pizza icon is highlighted. The user moves their finger up and down quickly, and the ham pizza icon is left clicked, and activated. The activated ham pizza icon is associated, to activating a restaurant function of the eye computer, to have the ham pizza, include in the user's order.

Thought Input

The user gazes at the hamburger input icon command they want to activate, for a predetermined amount on time, such as, 0.4 seconds, the hamburger icon is highlighted. The user thinks activate, which activates the hamburger icon. The activated the hamburger icon, causes the hamburger to be included in the user's order.

Voice Recognition

A microphone is connected to the computer, and positioned to detect the user's spoken words. Words spoken, by the user, can activate the displayed icons.

The user can verbally, input one of the mid-air input icons, or letters of the mid-air display menu, by verbally describing one or more of the displayed mid-air input icons, or letters. Voice recognition detects the icon being described, such as, saying enter, left clicks a displayed enter icon, and activates the enter icon. The activated enter icon is associated, to activating an enter function of the menu AR Headset Self Driving Car Description A self-driving car's control panel, is displayed, by an augmented reality AR headset, glasses. A user views the display, while wearing the headset on their head, and looking through lenses in the headset. The control panel could also be viewed by projecting it to the user's eyes. The headset and user are inside of the car. The AR headset is a portable computer, with a display.

The augmented reality, or mixed reality MR headset, has an eye tracker positioned in the headset, to view the user's eyes of holographic mid-air input symbols. The eye tracker views a user's eyes, when they look at the mid-air display, as shown in FIGS. 12, and 13.

The display 1446 shows, car input buttons, such as, start car, stop car, a fan speed increase, or decrease, a heat temperature thermostat increase or decrease temperature, and an interactive internet map.

The headset computer connects to a global positioning system GPS device, in the headset. The map knowns the headsets location. The map is used, for the user to request the car travel, to a chosen destination on the map. The map displays the cars location with a car icon on the map. The map can be used to find the car, by using the map to follow a route to the car.

The computer has car operating software, computer operating software, and eye tracker operating software. The computer operates the car, or connects to computers that operate the car, operates the display, and operates the eye tracker.

The car and headset computer can connect to each other through an internet, with the car connected to the internet, and the headset connected to the internet.

The car icon is connected to an internet address of the car's control panel, user menu components. The car control panel to be sent over the internet to the headset, by the activation of the car icon. The headset operates the car over the internet.

Also the connection of the car and portable computer can be through radio waves, with the activation of the car icon, by the user, associated to activating a request to send the control panel to the headset by using radio waves. The headset operates the car using the radio waves.

The computer has car operating software, computer operating software, and eye tracker operating software. The computer operates the car, the display, and the eye tracker.

Voice Recognition

A microphone is connected to the computer, and positioned to detect the user's spoken words. Words spoken, by the user, can activate the displayed icons. The input icons are highlighted by gaze, and are left clicked by saying a preprogrammed activating word like, click.

The user can verbally, input one of the mid-air input icons, or letters of the mid-air display menu, gaze highlighting a such as, an increases volume icon, and by the user verbally saying click. Voice recognition detects the saying click, and left clicks the displayed increases volume icon, and activates the increases volume icon. The activated increases volume icon is associated, to activating an increases volume function of the radio.

Hand Touch Input

A hand gesture camera is connected to the computer, and positioned to view the user's hand, while wearing the headset. The gesture camera detects by the hand touching the icons in mid-air, by the user, can activate the displayed icons. The user touches the decrease volume icon. The decrease volume icon is activated by the touch. The activated decrease volume icon, decease the volume of the radio.

Hand Gestures Input

An outside camera is connected to the headset computer. The outside camera is part of the headset. The outside camera views the user's fingers. A hand gesture software is part of the computer.

Temperature increase or decrease icons are displayed. The user gazes at the increase temperature icon. The temperature icon is highlighted. The user moves their finger forward as if touch imputing one of the icon. The forward finger movement is interpreted as a left click gesture. The interpretation left clicks, and activates the icon. The activated increase icon increases the temperature inside the car.

The start icon is highlighted, by gaze. The user moves their finger up and down quickly, and the start icon is activated. The activated start icon, activates the car to start moving toward a chosen destination.

Thought and Gaze Input

A thought input device is part of the headset, and connected to the computer. The user uses gaze to highlight the command they want to activate, such as, the increase volume icon for a predetermined amount on time, such as, 0.4 seconds highlights the increase volume. The user thinks yes at the increase volume icon. The yes thought left clicks the highlighted increase volume icon. The activated increase volume icon increases the volume of the radio in the car.

Car's Devices

The car's devices can include, radio 1406, climate control temperature, head lights, interior lights, ignition on or off, air fan speed, air venting defrost or feet warming, movies for passengers, computer games for passengers, engine temperature, oil warning light, and seat belt off warning.

The interface includes car device components commands, such as, radio station search, pre-set radio stations, increase or decrease radio volume, heat increase or decrease, fan speed increase or decrease, windshield wipers on, wiper speed increase or decrease, internet map, headlights on, and headlight low or high beam.

The radio hologram interface includes, a graphic number station indicator 1414, 1426, a sound volume indictor 1416, 1418 a switch to another device switch, sound volume increases 1420 or decrease 1422 holograms, and radio station change station increase or decrease holograms 1426.

The vehicle is equipped with, and connected to the cars computer, pedestrian or vehicle detection sensors, radar, and vehicle cameras and sensors (not shown).

Car instruments can be displayed by holograms, such as, speedometer, engine revolutions, engine oil alert, and engine temperature alert.

The radio hologram interface includes, a graphic number station indicator 1414, 1426, a sound volume indictor 1416, 1118 a switch to another device switch, sound volume increases 1420 or decrease 1422 holograms, and radio station change station increase or decrease holograms 1426.

The User Input Devices for Described Embodiments in the Proceeding Embodiments

The eye tracker, thought headset, hand gesture camera, finger following camera, and microphone, are user input devices. The input devices, are part of the headset. The input devices, detect eye gaze, thought, mid-air touch, finger control of a displayed cursor, and spoken words. The user's eye gaze, thought, mid-air touch, finger movement, or spoken words is detected by the input devices. Either the detected eye gaze, thought, mid-air touch, finger movement, or spoken words, can be used to active the displayed input icons.

The detected input, activates the input icons. The activated input icons are associated to influencing, and operating the self-driving car devices, and the other alternately described embodiments.

AR Headset Self Driving Car Operation

The map shows the user's present location 1434 on the map 1432, as shown in FIGS. 12, and 13. The present location is shown by a figure, such as, a circle.

The user gazes, and gaze point that contacts a point on the map 1402, creates a location 1444, on the displayed map, that the user wants the car to move to. The move to location is highlighted with a visual, clue, such as, a dot, a flag, or a cursor point 1444 on the display. The user can move the dot to another location, by activating the dot to follow, the gaze to the other location.

The map has a search icon 1448, The activate search icon opens a search window. In the search window, is typed building addresses, names of business, names of locations. The found locations are displayed on the map.

The user can type in a start location, and a destination location, and different routes will be shown between the two locations. The user is shown one or more routes 1438, to the desired location. The user gazes at the route the user desires. The displayed chosen route 1436 is highlighted. A start travel icon 1440 is displayed. The user gazes at a start travel icon 1440, and the car starts travelling the route. A stop travel icon 1442 is displayed. The stop travel icon is highlighted by gaze. The user gazes at the stop travel icon, and the car parks safety out of the way of traffic.

A voice icon 1446 announces the headsets location. A compass icon 1430 points to the north.

In another embodiment, a thought input device is part of the headset, and connected to the computer in the headset. The user gaze to activate the desired route. The user gazes at the route the user desires. The displayed chosen route 1436 is highlighted. The start travel icon 1440 is displayed. The start travel icon is highlighted by gaze. The user thinks yes at the highlighted start travel icon. The yes thought left clicks the highlighted start travel icon. 1440, the activated start travel icon starts the car travelling the route.

The stop travel icon 1442 is displayed. The user gazes at the stop travel icon, which highlights it, the user thinks stop, and the stop icon is left clicked, activated, which activates the car to park safety out of the way of traffic.

If a pedestrian or vehicle is detected to close to the car, or on a course where the pedestrian or vehicle may contact the car, the pedestrian is highland on the display. The pedestrian or vehicle is viewable with a red flashing outline, halo around the pedestrian. The highlighting allows the driver, to act to avoid possible contact, with the pedestrian or vehicle. The user can look at the stop car icon to turn off the car in an emergency. The pedestrian or vehicle is detected by sensors, radar, pedestrian or vehicle cameras and sensors in the car (not show), which are connected to the computer.

The user can increase the volume of the radio, connected to the computer, by gazing at the increase icon 1420, or decrease volume symbol of the radio by gazing at the decrease volume symbol icon 1422, as shown in FIG. 21. The can view the volume of the radio on the volume indicator icon. The user can view a number icon 1424 of the radio station the radio is tuned to. The user can change the station, by gazing at the radio station change station increase or decrease icon 1426. The user can switch between the radio receiving amplitude modulation AM, and frequency modulation FM radio waves, by gazing at the change car component symbol icon 1412.

The user can turn on the head lights by gazing at the turn on head lights icon (not shown). The user's contact with the light icon is detected by the eye tracker, and connected computer. The computer activates the turn headlight on function. The computer sends instructions to the headlights switch to turn on the headlights. The light switch is switched to the on position, the lights are turned on.

The user can turn on the head lights by gazing at the turn on head lights (not shown) with their gazing. The user's gaze contact with the light icon is detected by the eye tracker, and the connected computer. The computer activates the turn headlight on function. The computer sends instructions to the headlights switch to turn on the headlights. The light switch is switched to the on position, the lights are turned on.

Mid Air Touch of a Store Input Icon Description and Operation

Glasses 902 can be used to shop in a store, without interacting with a store employee, illustrated in FIGS. 9A, and 9B. The user 910 can self-serve checkout at a self-serve checkout station 906, by using mid air touch to activate input items on a self-serve.

A camera in the glasses, and connected to the glasses computer, views the user's fingers, when they are in front of the glasses. The user can touch an icon, and the touch activities the icon. The glasses computer detects when the finger is in the same space as the displayed icon, and interprets it as an activation of the icon. The detected finger contact with the space, activates the icon.

The finger touches the number 4 icon, and the 4 is activated. The 4 is used to type one number, of a personal identification number PIN, into the computer. A 2 number 914 can be touched, to input the amount of 2 oranges the user has, when asked by the checkout how many oranges the user has.

The glasses display the checkout station control panel 906. The user can also checkout using a barcode scanner incorporated into the glasses, by scanning the items barcodes with the glasses.

Voice Recognition

A microphone is connected to the computer, and positioned to detect the user's spoken words. A voice recognition software is programmed in to the computer. Words spoken, by the user, can activate the displayed icons, that are highlighted by gaze.

The user can verbally, input one of the mid-air input icons, or letters of the mid-air display menu, gaze highlighting a such as, an enter icon, and by the user verbally saying yes. Voice recognition detects the saying yes, and left clicks the displayed enter icon, and activates the enter icon. The activated enter icon is associated, to activating an enter function of the menu.

AR Glasses Using a Hand Clicker Connected to an ATM Description

A Hand-Held Clicker

An eye tracker headset has a computer. A hand-held clicker input device is wirelessly connected to the headset computer. The clicker held in the user's hand, left clicks, an input icon displayed by the headset.

Gaze is directed at an input icon, the clicker is activated by finger pressure for the user, the activated clicker signals the computer to left click, and activate the icon. The icon is activated.

An ATM

An automatic teller machine ATM, is connected to the headset computer, by radio waves. The computer can act as the primary computer for the ATM, and operate the ATM, or can connect to a ATM computer that operates the ATM.

The computer is programmed with an ATM operating software, an eye tracker software, and a computer operating software. The computer is connected to an internet, for communicating to with ATM devices, servers, or other computers over the internet.

The AR glasses are connected, to a blue tooth or Wi-Fi radio device transmitter and receiver. The automatic teller machine ATM is connected to a blue tooth or Wi-Fi radio device transmitter and receiver device. The glasses connect wirelessly to the ATM radio device when the glasses are within 5 meters or more of the ATM.

The ATM has software operating instructions for the various functions and devices of the ATM. The ATM instructions are displayed on a mid-air menu by the glasses. The mid-air menu, is viewable by a user The menu is pinned to the front of the ATM. A credit card debit card reader connected to. The ATM has a credit card reader. One card reader, is radio frequency identification card reader (not shown), for tapping the card on the reader, to input the card.

AR Glasses Using a Hand Clicker Connected to an Atm Operation

The user identifies themselves to the ATM. The user looks at the displayed holograms in mid-air. The eye tracker views the user's eyes, and determines the point that the user is gazing at on the displayed hologram.

The user views the one or more menu items that are displayed on the display screen. The user chooses one of the menu icon that they want to active.

The eye tracker detects the user's gaze at the display. The point where the user gases on the hologram, is the user's gaze point. The user gazes at the menu icon that they want to active. The item that is gazed at is highlighted. The user applies hand pressure to the clicker, the clicker left clicks, the highlighted item, And the item is click, or activated. The user can choose another item to activate.

The cursor follows the user's gaze point on the display. The user gazes at the menu icon that they want to active. The cursor moves to the item that is gazed. The cursor touches the item, or over lays the item, with the cursor being visible on top of the displayed item. The cursor is smaller than the item. The user gazes and clicks the highlighted item, and the item is clicked, or activated. The user can choose another item to activate.

Another way to activate an icon, is one of the icons can be highlighted by the user's gaze, and an enter icon is gazed and clicked, and the highlighted icon, is entered and activated.

The user gazes at the ATM display. The eye tracker detects the user's gaze. The display asks for the user's personal identification number pin. A number ten key number pad, and or key board is displayed. The gazes at the number that the user wants to input such as, a number. The number 2 is highlighted, the cursor is located at the number 2. The clicker left clicks the number 2, and the number 2 is activated. The activated number 2 forms part of the pin number.

The user inputs numbers until the pin number is complete. The user gazes and clicks, a displayed enter input icon, until it activates. The enter input icon inputs the pin number. The user's account information is displayed.

The user can active different ATM services, by gazing and clicking, at icons displaying, and associated to a checking account balance, a savings account balance, a credit card account balance. The user can deposit funds, or withdraw funds from the different accounts, using gaze at inputs associated to the accounts, shown on the display.

The gaze is directed to the checking account balance. The checking account details are displayed. The gaze is directed at a checking account balance, having a withdrawal amount icon. Withdraw amounts are displayed, such as, 20, 40, 100, 200. The user can active with gaze and click, one of the displayed amounts. To enter a different amount, the gaze and click, is directed to a different amount.

The ten keypad is displayed, of inputting the different amount. The user gaze and clicks, each number, the 2 number, and the 0 number, that makes up the amount the user would like to withdraw, such as, a 20.00 amount. The user gazes and clicks. the enter icon. The withdrawal amount is entered, by activating the enter icon. The ATM dispenses the 20.00 amount.

The user is asked on the display, if the user would like another request. The user gaze and clicks, a cancel input icon, and the interaction is complete, and the user is signed out of their account.

Receiving the ATM's Menu

The ATM broadcast using radio waves, or on the internet, that it is available to have its control panel menu down loaded. The glasses receive the broadcast, and downloads the menu. The glasses display the ATM's menu in mid-air. The glasses and ATM are connected wirelessly, and transmit and receive information with each other.

The user can set the glasses, too automatically, or manually, connect to the ATM. When the glasses connect to the ATM, the display menu pad for the ATM is transmitted to the glasses. The received ATM control panel menu, is holographically display in mid-air, for the user to view and input in to.

The user inputs numbers into the menu pad, by individually gazing and clicking, at one of the numbers, such as, a number 4. The numbers are entered, to input a debit card pin number into the computer. The input is shown on the display. A credit card is read by the credit card reader.

The menu in the mid-air control panel, are pinned to a location which is gaze assessable by the user, when the user is near ATM, such as, 0.5 meters in front of the user. The user views the different input commands, for the ATM, such as, a ten-key number pad, amount of purchase, accept purchase amount, enter, and credit card number.

The user gaze and clicks, or uses thought to highlight the command they want activated, or speaks the command they want to activate, or uses gaze to activate the command they want activated.

The user gazes, with their eyes, at the 8-number input icon command they want to activate, the 8 number is highlighted. The is gaze and clicked, the icon command is left clicked, and the command is activated. The user can active another icon, after the first icon is activated. The eye tracker views and tracks, the user's eye's gaze while they wear the glasses.

The user gazes at the 8-number input icon command they want to activate, for a predetermined amount on time, such as, 0.4 seconds, the 8 number is highlighted. The user thinks activate, which activates the number 8 icon. The user can active another icon command after the first command is activated. The eye tracker can view and track, the user's eye's gaze while they wear glasses.

When an ATM icon is activated, the ATM transmits to the glasses that the icon is activated. The ATM sends data about the status of the activated device, such as, payment accepted, or enter pin number.

The data sent from the ATM is displayed on the mid-air display. The displayed data keep the user informed about the ATM operation, and interaction with the user. The user can use the displayed ATM data, to adjust the operation of the ATM, such, changing a personal identification number PIN number if a first number is incorrect.

Gaze and click, inputs of one of the holograms, by the use user's eyes, and hand, to input a request to the computer. The computer directs the ATM to carry out the input request of the user. For example, the user gaze at an enter input hologram. The enter input is detected by the eye tracker sensor and clicker the computer. The computer inputs a PIN number inputted by the user.

AR Glasses Connected to the Internet Description

AR glasses can connect to the internet, in different ways. One connection is for the glasses to connect to the internet, over a cell phone network, which is connected an internet server. A second connection is for the glasses to connect to an internet router that is connected to an internet server internet.

The glasses are connected to a blue tooth, Wi-Fi radio device transmitter and receiver. The glasses transmitter and receiver, connect wirelessly, using Wi-Fi, to an internet router, which has a transmitter and receiver.

Glasses Connection to Internet Through Phone

The glasses are connected to a mobile device (not shown) that is connected to the internet, such as, a smart phone, a laptop computer, or a tablet, using Bluetooth, or WIFI Direct. The glasses, and mobile each device have a blue tooth or Wi-Fi radio device transmitter, and receiver. The glasses connect wirelessly to the mobile device when the glasses are within 5 meters or more of the mobile device, or smart phone.

The glasses use the phone's connection to the internet, to connect to and access the internet. The internet is accessed over the cell phone network. Internet webpages can be displayed holographic ally, and interacted with by a user, with the devices in the glasses.

The glasses display a menu of internet applications APPS, or software operating instructions for the various functions and devices of an internet web browser, such as, translate page to another language, search, print page. The glasses APPS are displayed, on a mid-air menu by the glasses.

An AR keyboard, mouse, and touch input pad are part of the glasses display. The AR keyboard, mouse, and touch input pad, hover in mid-air within reach of the user's hands. The AR keyboard, mouse, and touch input pad, are operated by touch from the fingers. AR keyboard, mouse, and touch input pad, have input icons that are activated by the touch of the fingers. The AR keyboard, mouse, and touch input pad can be moved by the with the user's fingers, to different locations in front of the user.

A finger camera, and finger software in the glasses views the user's fingers, and detects when the fingers, are in the same space as the input icon. The fingers contact with the icons is interpreted as activation of the touched icon. The glasses display is displayed in mid-air. The user can interact with the display. The mid-air menu can be pinned to a location near the glasses.

The glasses have a cell phone network, transmitter and receiver, that connects to the glasses computer. The transmitter and receiver, connect to a cell phone network, such as, a Global System for Mobile GSM, or a Code Division Multiple Access CDMA cell phone network AR Glasses Connected to the Internet Operation The user uses eye tracking input, to activate a holographic weather icon, on a mid-air web page 804. The user gazes at the icon and the icon activates. The user interacts, using the eye tracker, and inputs into a display in mid-air.

The display icons, include, a web search icon, or other search engine icon. The user can type in a word, words into the search engine, to search the internet for internet links associated to the word.

Displayed icons can be activated, such as, news, a start button, web page links, sports, entertainment, computer games, social media, and health. The user inputs letters, icons, and numbers into the laptop, by individually inputting one of the them.

The user can move the mid-air mouse, with their hand, to move a cursor on the display. The user's finger presses the left click of the mouse, to left click an icon contacting the cursor. The mid-air mouse can left click on icons, to activate icons, on the display. The input of the keyboard letters, numbers, is shown on the display. The input commands affect the operation of the phone.

The user can mid-air touch input one of the mid-air input icons, or letters of the mid-air display menu, by touching one or more of the of the displayed mid-air input icons, or letters. The user can mid-air touch input one of the mid-air input icons, or letters of the mid-air display menu, by touching one or more of the of the displayed mid-air input icons, or letters.

The user can gaze, of 0.5 seconds, to input one of the mid-air input icons, or letters of the mid-air display menu, by gaze inputting one or more of the displayed mid-air input icons, or letters. The user can eye tracking input one of the mid-air input icons, or letters of the mid-air display menu, by eye inputting one or more of the displayed mid-air input icons, or letters.

The user can use thought to input one of the mid-air input icons, or letters of the mid-air display menu, by thought inputting one or more of the of the displayed mid-air input icons, or letters, after the icon has been highlighted by eye gaze.

The keyboard can be used in an environment where there is concern for bacterial contamination, in a bacteria free environment, such as, a medical, and hospital environment. The keyboard can also be used in hospital surgery rooms, to hygienically touch input, into a hospital computer while operating. The letters inputted into the keyboard are shown on the display.

Operating A Device Over the Internet

The user can operate a device over the internet. For example, the glasses can connect to a temperature control unit, or thermostat for a living area, over the internet. The user can view a hologram of the thermostat, and change the temperature setting of the thermostat, by gazing at of one several different settings displayed on the thermostat. The gaze inputs a different setting into the thermostat. The different setting is sent to the thermostat, which uses the different setting to change the temperature setting of the thermostat.

CONCLUSIONS, RAMIFICATIONS AND SCOPE

From the preceding description, and drawings, it becomes apparent, that a user can use eye gaze, to activate holographic input icons. The gaze at the input icons, is detected by an eye tracker, and the displayed icons are created by an AR headset.

The input icons may operate devices, functions, in the headset, such as, an enter command, or devices outside of the headset, such as, internet search by a webpage, or an elevator's operation.

Eye input frees the user's hands, and voice, from needing to use them to input, the input icons. Freed hands allow the user to do other things with their hands, such as, rest their hands, or steer a car. The user avoids touching physical input icons, that might have bacteria on them, by inputting with their eyes, instead if their fingers.

Other devices that the eye tracker AR headset may operate, include, hospital bed control panels, public computer terminals that use a keyboard, such as, library Keyboards, airplane toilet control panels, payphone input displays, hotel TV remote controls, hotel door lock input panels, shared workplace keyboards, and gym athletic equipment, and interactive display screens.

Although the description above contains much specificity, these should not be construed as limiting the scope of the embodiments, but as merely providing illustrations, of some of the presently preferred embodiments.

The reader will see that at least one embodiment, of the eye tracker AR headset, which uses eye gaze, to activate displayed input icons, provides a more reliable, healthier and economical device, that can be used by persons of almost any age.

Although the embodiments of the eye tracker AR headset, have been described in connection with various embodiments, it should be understood that various modifications, additions and alteration may be made to the embodiments, without departing from the spirit and scope of the embodiments, as defined in the appended claims.

The invention claimed is:

1. Glasses, the glasses being augmented reality glasses having an eye tracking device, comprising,
the glasses connect wirelessly to a car at a predetermined distance, the car drives itself, the car has a plurality of operations,
a plurality of icons are displayed by the glasses in mid-air, the icons are viewed when the user looks through the glasses,
one of the icons is associated to one of the operations of the car,
one of the icons associated to one of the operations of the car displays the operation of the car that the icon is associated to,
a map is shown on the display,
the map displays a location of the car,
a point is on the map,
the point is made by the user gazing at a location on the map for a predetermined time,
the point is a destination for the car to move to,
one of the icons is a start icon, the start icon is associated to a start following route operation of the car,
the start following route operation starts the car to follow a route to the destination,
the eye tracker is positioned to detect the user's eye gaze at one of the icons, the glasses have a timer, the detection of gaze at one of the icons is associated to the activation of the timer,
at a predetermined time of activation of the timer the icon is activated,
the activation of one of the icons is associated to an activation of the operation of the car that the icon is associated to.

2. The glasses of claim 1, further including the activation of the operation of the car is displayed on the display.

3. The glasses of claim 1, wherein the wireless connection is a wireless connection through the internet.

4. The glasses of claim 1, further including one of the icons is a stop car icon,
one of the car operations is a car park operation.

5. The glasses of claim 1, further including one of the icons is a head lights on for the car icon,
one of the car operations is a head lights on operation.

6. The glasses of claim 1, further including the car sends the icons to the glasses when the glasses connect to the car.

7. The glasses of claim 1, wherein the connection of the glasses wirelessly to the car is a connection to the car is available is displayed on the display,
the displayed available car connection is activated by eye gaze at the displayed available car connection,
the activated car connection connects the glasses to the car through an internet.

8. The glasses of claim 1, wherein the wireless connection of the glasses to the car within a predetermined distance is the car broadcasting that the car is available for connecting to the glasses,
the glasses connecting to the car when the car available broadcast is detected by the glasses.

9. The glasses of claim 1, wherein the wireless connection of the glasses to the car within a predetermined distance is the glasses broadcasting that the glasses are available for connecting to the car,
the car connecting to the glasses when the glasses available broadcast is detected by the car,
further including the detection of gaze at the icon is associated to a highlighting of the icon,
further including a cursor is displayed, the cursor is superimposed on the icons,
the cursor occupies the location of the detected gaze,
a cursor eye following software is in the glasses,
further including a timer is displayed at a predetermined time of detected gaze at the icon.

10. A method for using eye gaze to operate glasses, the glasses being augmented reality glasses, comprising,
having a car that drives itself with the car having a plurality of operations,
connecting the glasses wirelessly to the car when the glasses are within a predetermined distance to the car,
transferring icons from the car to the glasses with the icons being input icons,
displaying the icons in midair with the icons viewable when the glasses are worn by a user, associating one of the icons to one of the operations of the car, having the icon associated display the operation of the car that the icon is associated to, displaying a map in midair, having a car location of the car shown on the map, creating a location on the map for the car to move to by gazing at a point on the map for a predetermined time, or inputting the location for the car to move with text inputted by eye gaze into a text input device with the text input device displayed in midair, with an eye gaze tracker positioned in the glasses to view the eye gaze of the user at the icons, map, and the text input device, displaying a plurality of routes to the location from the car on the map, highlighting one of the routes by gazing at one of the routes for a predetermined time, having one of the car operations be the car following the highlighted route to the location on the map, having one of the icons a start icon, associating an activation of the start icon to an activation of the car following the route to the location operation with the activation of the start following route operation starting the car to follow the highlighted route to the location, associating the activation of one of the icons to an activation of the car operation associated to the icon, activating one of the icons with eye gaze with a detected predetermined time of gaze at the icon, activating the start icon with eye gaze.

11. The method of claim 10, further providing displaying the activation of the operation of the car on the display.

12. The method of claim 10, wherein the connecting the glasses wirelessly to the car is connecting the glasses wirelessly to a phone, connecting the phone wirelessly to the car through an internet.

13. The method of claim 10, further providing storing the received icons in the glasses with the glasses having a storage, displaying the stored icons when the glasses connect with the car.

14. The method of claim 10, further providing one of the icons is the icons is a volume increase icon for a radio in the car, the car operation is a volume increase for the radio.

15. The method of claim 10, wherein the glasses connect wirelessly to a car at a predetermined distance is determining when a location of the glasses on a map is at the predetermined distance from a location of the car on the map.

16. The method of claim 10, further providing displaying that a connection to the car is available, activating the displayed available car connection with eye gaze at the displayed connection, connecting the glasses to the car with the activation of the car connection.

17. The method of claim 10, one of the icons is a fan speed increase icon, the car operation is an increase air fan speed.

* * * * *